(12) United States Patent
Bergeron et al.

(10) Patent No.: US 8,175,641 B2
(45) Date of Patent: May 8, 2012

(54) SELECTIVE PUSH-TO-TALK

(75) Inventors: Mark Bergeron, Grafton, MA (US);
Paul G. Yamkovoy, Acton, MA (US)

(73) Assignee: Bose Corporation, Framingham, MA (US)

( * ) Notice: Subject to any disclaimer, the term of this patent is extended or adjusted under 35 U.S.C. 154(b) by 265 days.

(21) Appl. No.: 12/770,339

(22) Filed: Apr. 29, 2010

(65) Prior Publication Data

US 2011/0269412 A1    Nov. 3, 2011

(51) Int. Cl.
*H04M 1/00* (2006.01)
(52) U.S. Cl. .................... 455/556.1; 200/339
(58) Field of Classification Search ............... 455/556.1, 455/518, 519, 426.1; 379/27.06, 17, 422; 200/50.36, 519, 536, 339
See application file for complete search history.

(56) References Cited

U.S. PATENT DOCUMENTS

| | | | |
|---|---|---|---|
| 2003/0013503 A1* | 1/2003 | Menard et al. | 455/569 |
| 2003/0029707 A1* | 2/2003 | Gillman et al. | 200/339 |
| 2004/0147282 A1 | 7/2004 | Nakasato et al. | |
| 2008/0039017 A1 | 2/2008 | Kim | |

FOREIGN PATENT DOCUMENTS

GB    2449229 A    11/2008

OTHER PUBLICATIONS

Invitation to Pay Additional Fees dated Aug. 11, 2011 for International Application No. PCT/US2011/033932.
International Search Report and Written Opinion dated Dec. 1, 2011 for International Application No. PCT/US2011/033932.

* cited by examiner

*Primary Examiner* — Tu X Nguyen
(74) *Attorney, Agent, or Firm* — Bose Corporation

(57) ABSTRACT

A push-to-talk (PTT) switch with biasing to a first center position in which in which the PTT function of neither one of up to two audio devices is engaged, also having a first operated position to which the switch may be moved by hand operation to cause the PTT function of the first one of the two audio devices to be engaged, and further having a second operated position to which the switch may be moved by hand operation to cause the PTT function of the second one of the two audio devices to be engaged.

20 Claims, 13 Drawing Sheets

SELECTIVE PUSH-TO-TALK

TECHNICAL FIELD

This disclosure relates to monitoring connection between a headset and one or more of an intercom system (ICS) and a radio, and to automatically altering the operation of a passive audio mixer and/or a push-to-talk (PTT) manually-operable control.

BACKGROUND

Two-way communications headsets are in common use in many types of vehicles and with various large pieces of machinery, especially vehicles and machinery that create or are typically operated in a high noise environment such that necessary two-way communications with the driver, operator or pilot would be impaired without such headsets. Examples of such noisy environments include airplane cockpits, driver's compartments in commercial trucks and tractors, operator cabins in cranes and tunnel boring machines, and crew compartments in tanks and other military vehicles. It is commonplace for such vehicles and machinery to incorporate an intercom system providing one or more connection points to which such headsets are coupled. Such intercoms typically cooperate with multiple ones of such headsets to enable personnel within or in the immediate vicinity of such vehicles to communicate with each other, and such intercoms typically incorporate long-range wireless transceivers enabling personnel to use such headsets in communicating with other personnel at a distance.

It has recently become desired to further enable such headsets to be coupled to portable audio devices that personnel may carry with them, in addition to being able to be coupled to an intercom system of a vehicle or large piece of machinery. Therefore, it has become desirable to enable the simultaneous coupling of a headset to both an intercom system and a personal audio device in a manner that provides a high degree of ease of use of such a combination, and incorporates the ability to maintain a high degree of functionality in the event of the headset losing power normally provided by its own power source without draining the power sources of portable radios or other devices to which the headset is connected.

SUMMARY

A push-to-talk (PTT) switch with biasing to a first center position in which in which the PTT function of neither one of up to two audio devices is engaged, also having a first operated position to which the switch may be moved by hand operation to cause the PTT function of the first one of the two audio devices to be engaged, and further having a second operated position to which the switch may be moved by hand operation to cause the PTT function of the second one of the two audio devices to be engaged. Apparatus and method to monitor the coupling of one or two audio devices and to augment the function of the PTT switch to cause the PTT function of one audio device to be engaged regardless of which of the two operated positions into which the switch is moved in response to there being only the one audio device coupled to the apparatus and in response to the one audio device being a radio, to cause the PTT function of either one of two audio devices to be selected to be engaged depending on which operated position to which the PTT switch is moved in response to there being only one audio device in the form of an intercom system (ICS) coupled to the apparatus with the other audio device in the form of a radio being coupled through the ICS, and to allow the PTT to be used to select the PTT function of either one of two audio devices to be engaged in response to there being two audio devices in the form of radios coupled to the apparatus. Apparatus and method to mix audio provided by a radio with audio provided by an ICS in which the audio of the radio being mixed with audio provided by the ICS and presented to one ear of a user, and in which audio provided by the ICS is presented to the other ear of the user without being mixed with audio provided by the radio.

In one aspect, an apparatus includes a first connector to enable the coupling of a first audio device to the apparatus; a second connector to enable the coupling of a second audio device to the apparatus; and a push-to-talk (PTT) switch having a center position, operable to a first non-center position from the center position to engage a PTT function of the first audio device at a time when the first audio device is coupled to the apparatus, operable to a second non-center position from the center position to engage a PTT function of the second audio device at a time when the second audio device is coupled to the apparatus, mechanically structured to prevent the PTT functions of both of the first and second audio devices from being simultaneously engaged, and in which a biasing force tends to bias the PTT switch towards the center position from the first and second non-center positions.

Implementations may include, and are not limited to, one or more of the following features. The PTT switch may include a rocker switch having a first surface and a second surface, wherein the PTT switch is operable to the first non-center position by pressing on the first surface and is operable to the second non-center position by pressing on the second surface. The PTT switch may further include a spring providing at least a portion of the biasing force to tend to bias the PTT switch toward the center position from at least one of the first and second non-center positions. The apparatus may further include a communications microphone to detect speech to be conveyed to at a remotely located person through the PTT function of one of the first and second audio devices of which the PTT function is engaged through operation of the PTT switch.

The apparatus may include a headset having at least one acoustic driver structured to be positioned adjacent at least one ear of a user of the apparatus at a time when the apparatus is worn on the user's head to acoustically output audio provided by at least one of the first and second audio devices. The PTT switch may be disposed on a casing of the headset in which the acoustic driver is disposed. The apparatus may further include a control box on which the PTT switch is disposed and coupled to a casing of the headset in which the acoustic driver is disposed by a cable or by a wireless connection.

In another aspect, an apparatus includes a first radio; a second radio; and a push-to-talk (PTT) switch having a center position, operable to a first non-center position from the center position to engage a PTT function of the first radio, operable to a second non-center position from the center position to engage a PTT function of the second radio, mechanically structured to prevent the PTT functions of both of the first and second radios from being simultaneously engaged, and in which a biasing force tends to bias the PTT switch towards the center position from the first and second non-center positions.

Implementations may include, and are not limited to, one or more of the following features. The PTT switch may include a rocker switch having a first surface and a second surface, wherein the PTT switch is operable to the first non-center position by pressing on the first surface and is operable to the second non-center position by pressing on the second surface. The PTT switch may further include a spring providing at least a portion of the biasing force to tend to bias the PTT switch toward the center position from at least one of the first and second non-center positions. The apparatus may further include a communications microphone to detect speech to be conveyed to at a remotely located person through the PTT function of one of the first and second radios of which the PTT function is engaged through operation of the PTT switch.

The apparatus may include a headset having at least one acoustic driver structured to be positioned adjacent at least one ear of a user of the apparatus at a time when the apparatus is worn on the user's head to acoustically output audio provided by at least one of the first and second radios. The PTT switch may be disposed on a casing of the headset in which the acoustic driver is disposed.

In still another aspect, an apparatus includes a radio; an intercom system (ICS); and a push-to-talk (PTT) switch having a center position, operable to a first non-center position from the center position to engage a PTT function of the radio, operable to a second non-center position from the center position to engage a PTT function of the ICS, mechanically structured to prevent the PTT functions of both of the radio and the ICS from being simultaneously engaged, and in which a biasing force tends to bias the PTT switch towards the center position from the first and second non-center positions.

Implementations may include, and are not limited to, one or more of the following features. The PTT switch may include a rocker switch having a first surface and a second surface, wherein the PTT switch is operable to the first non-center position by pressing on the first surface and is operable to the second non-center position by pressing on the second surface. The PTT switch may further include a spring providing at least a portion of the biasing force to tend to bias the PTT switch toward the center position from at least one of the first and second non-center positions. The apparatus may further include a communications microphone to detect speech to be conveyed to at a remotely located person through the PTT function of one of the radio and the ICS of which the PTT function is engaged through operation of the PTT switch.

The apparatus may include a headset having at least one acoustic driver structured to be positioned adjacent at least one ear of a user of the apparatus at a time when the apparatus is worn on the user's head to acoustically output audio provided by at least one of the radio and the ICS. The PTT switch may be disposed on a casing of the headset in which the acoustic driver is disposed.

Other features and advantages of the invention will be apparent from the description and claims that follow.

DESCRIPTION OF THE DRAWINGS

FIGS. 2a and 2b are perspective diagrams providing a closer view of variants of a controller portion of the headset of FIG. 1a.

DETAILED DESCRIPTION

What is disclosed and what is claimed herein is intended to be applicable to a wide variety of headsets, i.e., devices structured to be worn on or about a user's head in a manner in which at least one acoustic driver is positioned in the vicinity of an ear, and in which at least one microphone is positioned in the vicinity of the user's mouth to enable two-way audio communications. It should be noted that although specific embodiments of headsets incorporating a pair of acoustic drivers (one for each of a user's ears) are presented with some degree of detail, such presentations of specific embodiments are intended to facilitate understanding through examples, and should not be taken as limiting either the scope of disclosure or the scope of claim coverage.

It is intended that what is disclosed and what is claimed herein is applicable to headsets that also provide active noise reduction (ANR), passive noise reduction (PNR), or a combination of both. It is intended that what is disclosed and what is claimed herein is applicable to headsets structured to be connected with at least an intercom system and/or at least one radio through a wired connection, but which may be further structured to be connected to any number of additional devices through wired and/or wireless connections. It is intended that what is disclosed and what is claimed herein is applicable to headsets having physical configurations structured to be worn in the vicinity of either one or both ears of a user, including and not limited to, over-the-head headsets with either one or two earpieces, behind-the-neck headsets, two-piece headsets incorporating at least one earpiece and a physically separate microphone worn on or about the neck, as well as hats or helmets incorporating one or more earpieces and one or more microphones to enable audio communication. Still other embodiments of headsets to which what is disclosed and what is claimed herein is applicable will be apparent to those skilled in the art.

Figure 1A:
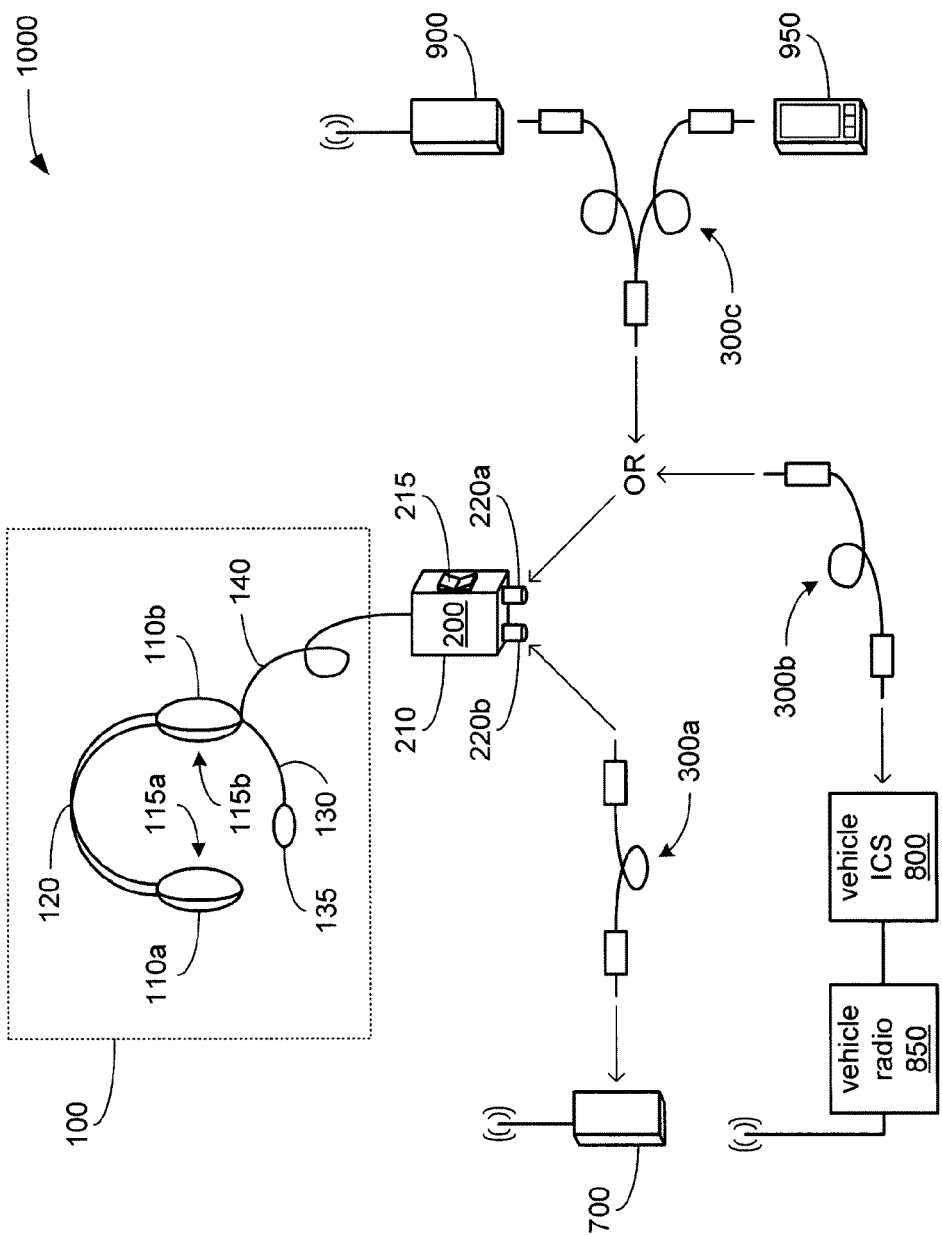
FIGS. 1a and 1b are perspective diagrams of variants of a headset.

FIG. 1a depicts an embodiment of a headset 1000 having an "over-the-head" physical configuration. The headset 1000 incorporates a head assembly 100, a control box 200, and one or more of cables 300a, 300b and/or 300c. The head assembly 100 incorporates a pair of earpieces 110a and 110b that each incorporate an acoustic driver 115a and 115b, respectively, a headband 120 that couples together the earpieces 110a and 110b, a microphone boom 130 extending from the earpiece 110b to support a communications microphone 135, and a cable 140 coupling the earpiece 110b to the control box 200. The control box 200 incorporates a casing 210, a manually-operable push-to-talk (PTT) switch 215, and a pair of connectors 220a and 220b by which one or more of the cables 300a-c may be coupled to the control box 200. Each of the cables 300a-c are configured to enable one or more audio devices to be coupled to the control box 200, specifically, one or more of a radio 700, a vehicle intercom system (ICS) 800 (and perhaps to a vehicle radio 850 through the ICS 800), a radio 900 and an audio source 950.

It should be noted that although the head assembly 100 is depicted with both the cable 140 and the microphone boom 130 being coupled to the same one of the earpieces 110a and 110b, other configurations of the head assembly 100 are possible in which they are coupled to separate ones of the earpieces 110a and 110b. It should be noted that although the cable 140 is depicted in a manner suggesting that the cable 140 is coupled to both the earpiece 110b and the control box 200 without connectors such that the cable 140 is not separable from either of these, other configurations are possible in which connectors (not shown) are used to couple the cable 140 to one or both of these. It should be noted that although the control box 200 is depicted as having a particular shape and a particular size relative to other components of the headset 1000, the control box 200 may be of any of a variety of sizes and shapes. Further, although the control box 200 is depicted as being physically distinct from all components of the head assembly 100, other configurations of the headset 1000 are possible in which the control box 200 is integrated into one of the earpieces 110a or 110b (such that the PTT switch 215 may be disposed on a casing of one or the other of the earpieces 110 or 110b, for example), or is integrated into the head assembly 100 in some other manner. It should be noted that although the connectors 220a and 220b are depicted as being disposed on the casing 210 of the control box 200, other configurations are possible in which one or both of the connectors 220a and 220b are separated from the casing 210 and are coupled to the casing 210 via one or more cables (not shown). It should be noted that although each of the cables 300a-c is depicted as having connectors on both ends, other configurations of one or more of the cables 300a-c are possible in which there are connectors only on the ends configured to be coupled to the control box 200.

The head assembly 100 is given its over-the-head physical configuration by the headband 120. Depending on the size of each of the earpieces 110a and 110b relative to the typical size of the pinna of a human ear, each of the earpieces 110a and 110b may be either an "on-ear" (also commonly called "supra-aural") or an "around-ear" (also commonly called "circum-aural") form of earcup. As will be explained in greater detail, the provision of an acoustic driver 115a and 115b in each of the earpieces 110a and 110b, respectively, enables the headset 1000 to acoustically output two-channel audio (e.g., stereo audio) to a user. However, it is important to note that it is commonplace for an intercom system (e.g., the ICS 800) to provide two-channel audio in which the two channels of audio do not necessarily represent a common piece of audio with a relationship such as "left" and "right" that provide a user with a spatial effect (the two channels may be related in other ways, or the very same audio may be provided on both channels). The microphone boom 130 positions the communications microphone 135 in the vicinity of the mouth of a user of the headset 1000 when the head assembly 100 is correctly worn such that the earpieces 110a and 110b overlie corresponding ones of the user's ears. However, despite the depiction in FIG. 1a of this particular physical configuration of the head assembly 100, those skilled in the art will readily recognize that the head assembly may take any of a variety of other physical configurations. By way of example, alternate embodiments may incorporate a "behind-the-head" or "behind-the-neck" (e.g., what may be called a "napeband") variant of band in place of the headband 120, may position the communications microphone 135 on a portion of one or the other of the earpieces 110a and 110b (rather than at the end of the microphone boom 130), and/or may be structured to permit one or both of the cable 140 and the microphone boom 130 to be detachable from the earpiece 110a in order to be attached to the earpiece 110b (i.e., made "reversible" between left and right sides).

As depicted, the cable 300a enables the radio 700 to be coupled to the connector 220a, the cable 300b enables the ICS 800 to be coupled to the connector 220b (and through the ICS 800, perhaps also the radio 850), and the cable 300c enables either or both of the radio 900 and the audio source 950 to be coupled to the connector 220b. The radio 700 may be coupled through the cable 300a to the control box 200, along with either the ICS 800 (and perhaps also the radio 850) through the cable 300b or one or both of the radio 900 and the audio source 950 through the cable 300c. As will be explained in greater detail, mixing circuitry of the control box 200 enables various forms of mixing of audio output by various combinations of these audio devices (i.e., the radio 700, the ICS 800, the radio 850, the radio 900 and the audio source 950) to the ears of a user of the headset 1000. As will also be explained in greater detail, the exact manner in which mixing is carried out changes automatically in response to which ones of these audio devices are coupled to the control box 200 and/or are active. As will be further explained in greater detail, a PTT circuit of the control box 200 enables a user of the head set 1000 to operate the PTT switch 215 to select to engage the push-to-talk (PTT) function of one of these audio devices at times when more than one of these audio devices are coupled to the control box 200, in which the use the PTT function of the selected device to convey their own speech (as detected by the communications microphone 135) to other persons. As will be yet further explained in greater detail, the exact manner in which the PTT switch 215 is operable to choose what audio device is to have its PTT function so engaged changes automatically in response to which ones of these audio devices are coupled to the control box 200.

It is envisioned that the headset 1000 is well suited for use by personnel who both travel in a noisy environment within a vehicle having the ICS 800 installed therein to enable communication among them, and also work collaboratively in a noisy environment outside the vehicle while relying on radios (such as the radio 700) carried by each of them to enable communication among them. It is further envisioned that vehicle may incorporate the vehicle radio 850 (accessible through the ICS 800, as will be explained in greater detail), that one or more of the personnel may carry another radio (such as the radio 900), and/or that one or more of the personnel may carry another audio device outputting audio (such as the audio source 950). One example of such use is that of soldiers in a military vehicle (a wheeled vehicle, a vehicle having tracks, a helicopter or other flying vehicle, a small motorized boat, etc.) having the ICS 800, and possibly also the vehicle radio 850. As will be familiar to those skilled in the art of military communications, such vehicles are often noisy inside such that the provision of the ICS 800 is necessary to enable personnel to hear each other talking. Further, depending on conditions at a destination reached by such a vehicle, battlefield sounds and/or physical separation of personnel on patrol or engaged in combat often necessitate the use of radios carried by each of the personnel to, again, hear each other talking. Still further, one or more of such personnel may also be carrying another radio to communicate across greater distance to still other personnel, perhaps personnel in another vehicle (e.g., a pilot in a supporting aircraft). Yet further, one or more of such may also be carrying another device outputting audio (i.e., another audio source) such as a talking global positioning system (GPS) device, etc. However, it should be noted that this envisioned military example is not the only possible application of the headset 1000, or of headsets having a similar configuration. Another envisioned application is that of pilots and passengers in propeller aircraft or helicopters in which an intercom system (e.g., the ICS 800) is also required for such people to hear each other talking. Further, such people may need to employ radios carried on their persons to continue being able to hear each other talking when their aircraft is on the ground in a noisy location (perhaps due to the running of engines and movement of air caused by propellers in motion).

Figure 1B:
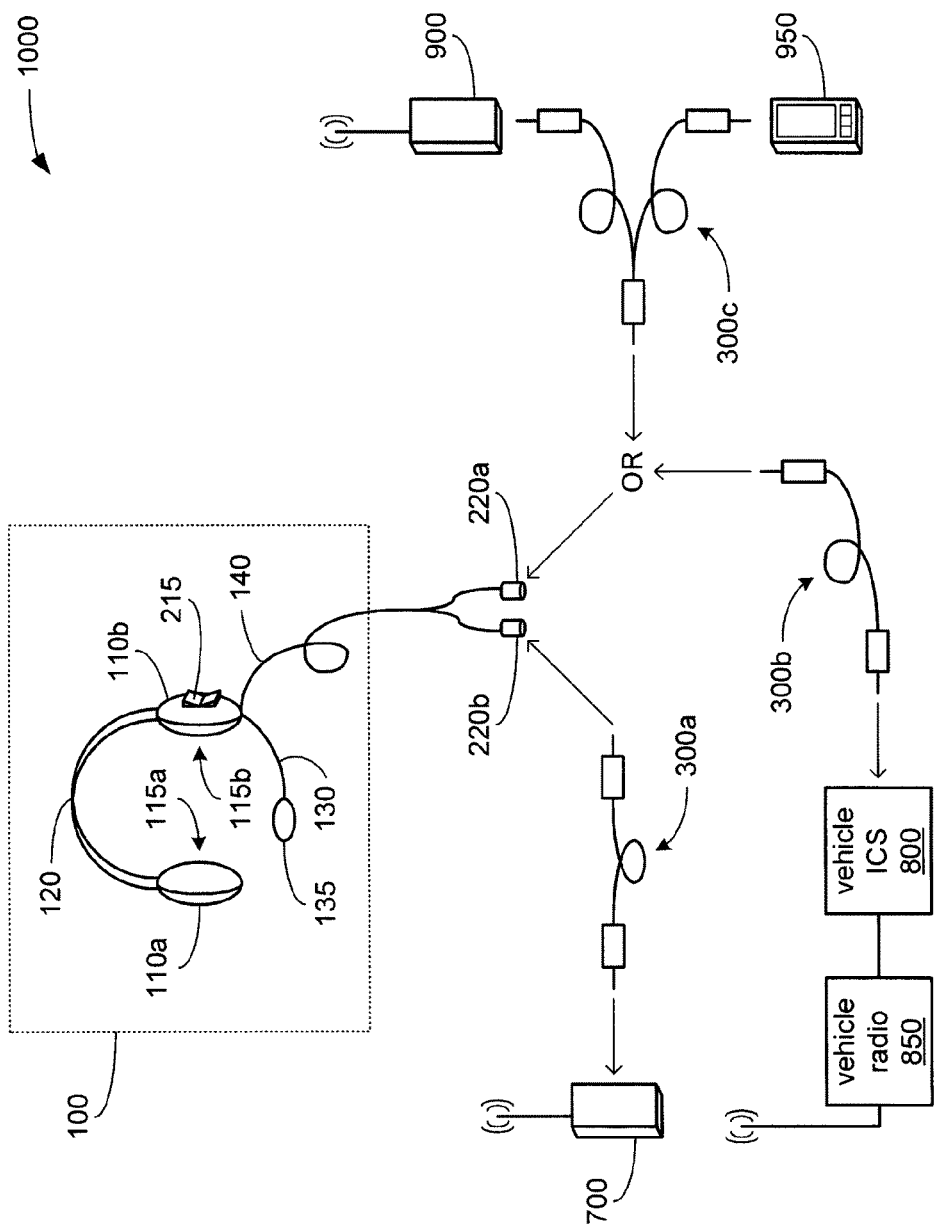

FIG. 1b depicts an alternate embodiment of the headset 1000 in which much of the functionality and at least some of the components (the type of components to be presented in greater detail) of the control box 200 are incorporated into one or both of the earpieces 110a and 110b. More specifically, the PTT switch 215 is disposed on one of the earpieces 110a or 110b, as previously discussed. Further, the connectors 220a and 220b are disposed at the end of the cable 140, which is depicted as being of a Y-cable configuration, although other configurations of the cable 140 to accommodate both of the connectors 220a and 220b are possible, as those skilled in the art will readily recognize.

Figure 2A:
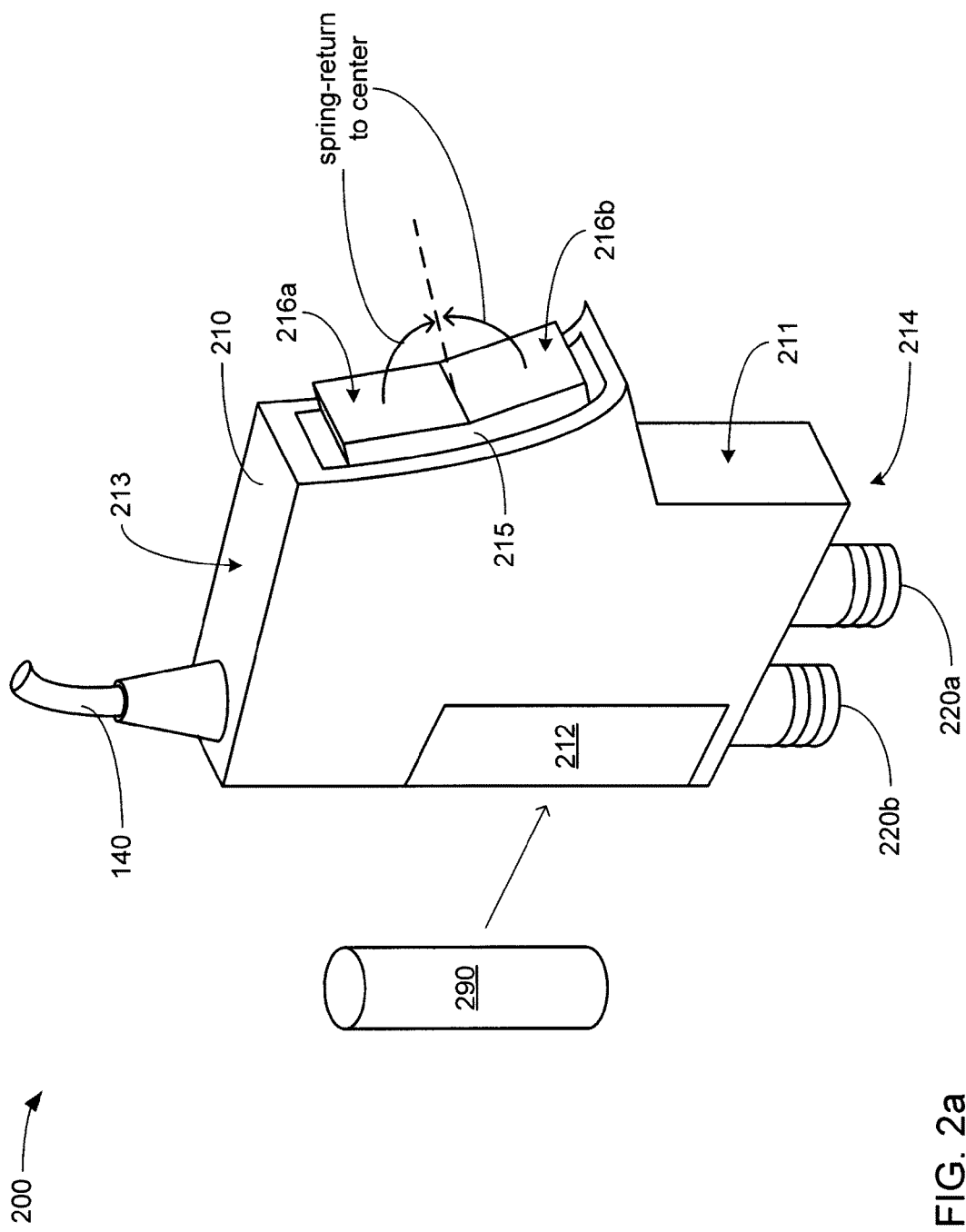

FIG. 2a provides an enlarged perspective view of a variant of the control box 200 to more clearly depict various features. As depicted, the casing 210 of the control box 200 may be shaped in a way to enable an almost "pistol-like" grip of the casing 210 in a user's hand such that an index and second finger of a user's hand are able to be positioned over surfaces 216a and 216b, respectively, of the PTT switch 215, while 3rd and 4th fingers are able to be positioned over the surface 211. The casing 210 also incorporates a removable cover 212 providing access to a compartment (not shown) into which a power source 290 (e.g., a battery) may be inserted to supply electrical power to circuits enclosed at least within the casing 210.

The cable 140 extends from a surface 213 of one portion of the casing 210 to couple the control box 200 to the head assembly 100, and the connectors 220a and 220b are disposed on a surface 214 of another portion of the casing 210. With this arrangement of where the cable 140 and the connectors 220a and 220b are disposed on the casing 210, this depicted variant of the control box 200 is configured to be essentially "in line" with the cable 140 and whatever other cables are coupled to the connectors 220a and 220b. This configuration may be deemed amenable to be held in place against a structural portion of the interior of an airplane cockpit or to a belt of a user via any of a variety of straps, clips, tapes, adhesives or other hardware (not shown). In an altered form, the cable 140 and both of the connectors 220a and 220b may be disposed on the portion of the casing 210 (e.g., all on the same surface 213 or 214), which may be deemed amenable to being held in place against a component of a piece of machinery or other device carried by a user (e.g., a power tool, a radio, etc.), against a component of a vehicle (e.g., clamped to a portion of a steering wheel, or a control column or "yoke" of an airplane, etc.), or in military applications, being somehow mounted to a portion of a gun (e.g., to the stock, the barrel, a handle, etc.) in a manner that allows a military user to operate the PTT switch 215 without taking a hand off the gun.

The PTT switch 215, as depicted, is a 3-position rocker switch having the surfaces 216a and 216b, and being configured to enable a user to selectively use the push-to-talk function of only one of multiple audio devices that may be coupled to the connectors 220a and/or 220b (e.g., the radio 700, the radio 900, the ICS 800, or the radio 850 through the ICS 800) at any given time. In other words, a user may press their index finger against the surface 216a to move the surface 216a in a rocking motion on a pivot of the PTT switch 215 inward (i.e., in a direction generally into the casing 210) to one non-center position to select and engage the PTT function of one audio device, or the user may press their second finger against the surface 216b to move the surface 216b in an opposing rocking motion on the same pivot of the PTT switch 215 inward to another non-center position to select and engage the PTT function of another audio device. However, as will be familiar to those skilled in the art of the design of rocker switches, it is not possible to press both of the surfaces 216a and 216b inward to select and engage the PTT function of both audio devices at the same time. Thus, the PTT switch 215 serves, by its mechanical design, to limit a user of the headset 1000 to engaging the PTT function of only one audio device at a time without use of electric power from any power source to do so. Further, as depicted by the arrows, the PTT switch 215 functions as a momentary switch when moved to either non-center position in the manner in which it may be operated to select one or the other of two audio devices, such that a user must continuously press (i.e., "hold") one of the surfaces 216a and 216b inward to keep the PTT switch 215 at a non-center position against a biasing force exerted by a spring (or other component, such as a living hinge—the direction of the biasing force from either non-center position being depicted by the arrows) incorporated into the PTT switch 215 that tends to bias it towards the depicted center position (and away from either non-center position) in which neither of surfaces 216a or 216b are pressed inward such that no audio device is selected. In the more common vernacular of those skilled in the art of the design of switches, the PTT switch 215 is a rocker switch with a spring-return to its center position and momentary action when operated to be "thrown" in either direction to one of two non-center positions to select an audio device to engage the PTT function of.

Figure 2B:
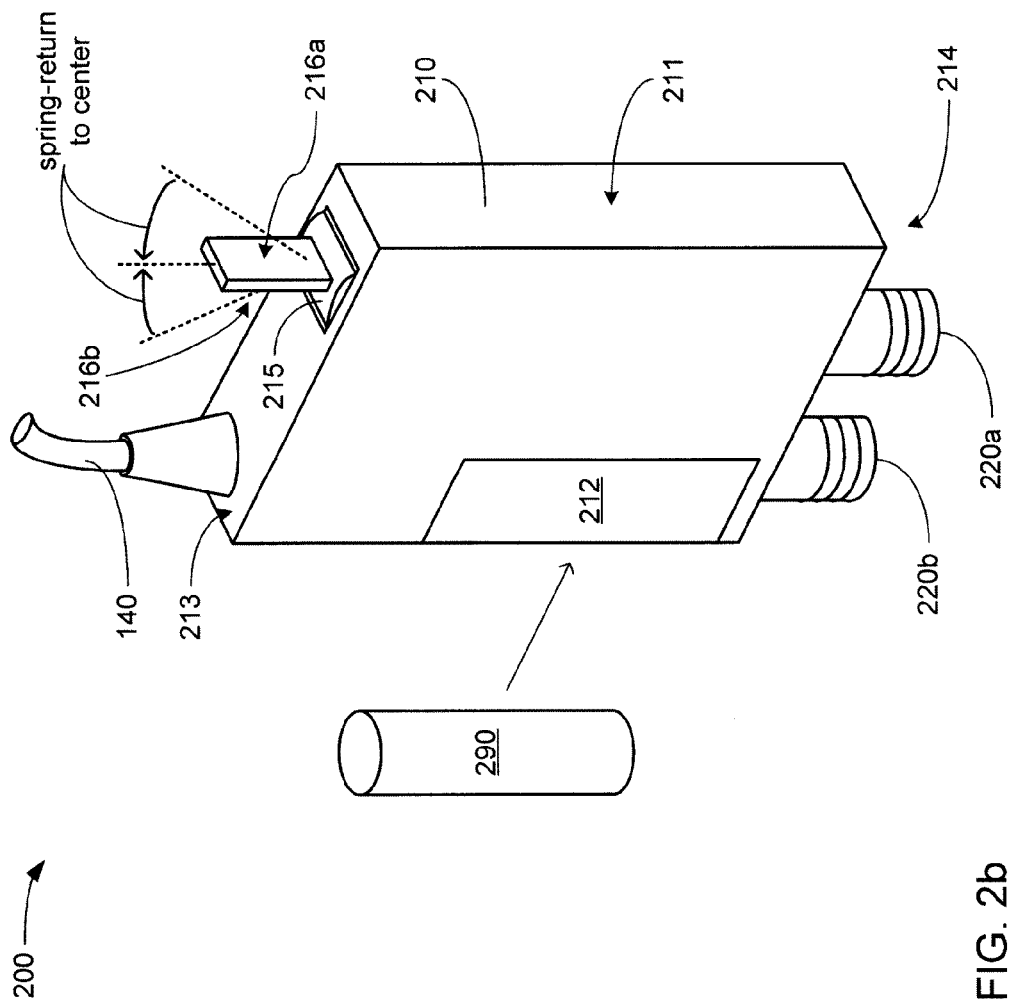

FIG. 2b provides an enlarge perspective view of another variant of the control box 200 to more clearly depict various features, among which is a variant of the PTT switch 215 implemented with a toggle or paddle type of switch, as opposed to the earlier depicted rocker switch. As depicted, the casing 210 of the control box 200 is shaped in a way to enable it to be gripped in a user's hand such that all four fingers (including the index and second fingers) overlie the surface 211, and the thumb is comfortably positioned to operate the PTT switch 215 by pressing that thumb alternately against one or the other of the surfaces 216a and 216b. Again, the casing 210 also incorporates a removable cover 212 providing access to a compartment (not shown) into which a power source 290 may be inserted to supply electrical power to circuits enclosed at least within the casing 210. Also again, the cable 140 extends from the surface 213 to couple the control box 200 to the head assembly 100, and the connectors 220a and 220b are disposed on the surface 214.

As has already been depicted with the PTT switch 215 implemented with a rocker switch, this depicted variant of the PTT switch 215 is also a 3-position switch carrying the surfaces 216a and 216b, and being configured to enable a user to selectively use the push-to-talk function of only one of multiple audio devices that may be coupled to the connectors 220a and/or 220b (e.g., the radio 700, the radio 900, the ICS 800, or the radio 850 through the ICS 800) at any given time. In other words, a user may press their index finger against the surface 216a to move the surface 216a in a rocking motion on a pivot of the PTT switch 215 to a non-center position to select and engage the PTT function of one audio device, or the user may press their second finger against the surface 216b to move the surface 216b in an opposing rocking motion on the same pivot of the PTT switch 215 to another non-center position to select and engage the PTT function of another audio device. However, again, it is not possible to press both of the surfaces 216a and 216b to select and engage the PTT function of both audio devices at the same time. Also again, the PTT switch 215 functions as a momentary switch in the manner in which it may be operated to either one of two non-center positions to select one or the other of two audio devices against a biasing force exerted by a spring (or other component, such as a living hinge—the direction of the biasing force from either non-center position being depicted by the arrows)) incorporated into the PTT switch 215 that tends to bias it towards the depicted center position (and away from either non-center position). Again, this variant of the PTT switch has a spring-return to its center position and momentary action when operated to be "thrown" in either direction to either non-center position to select an audio device to engage the PTT function of.

Figure 3:
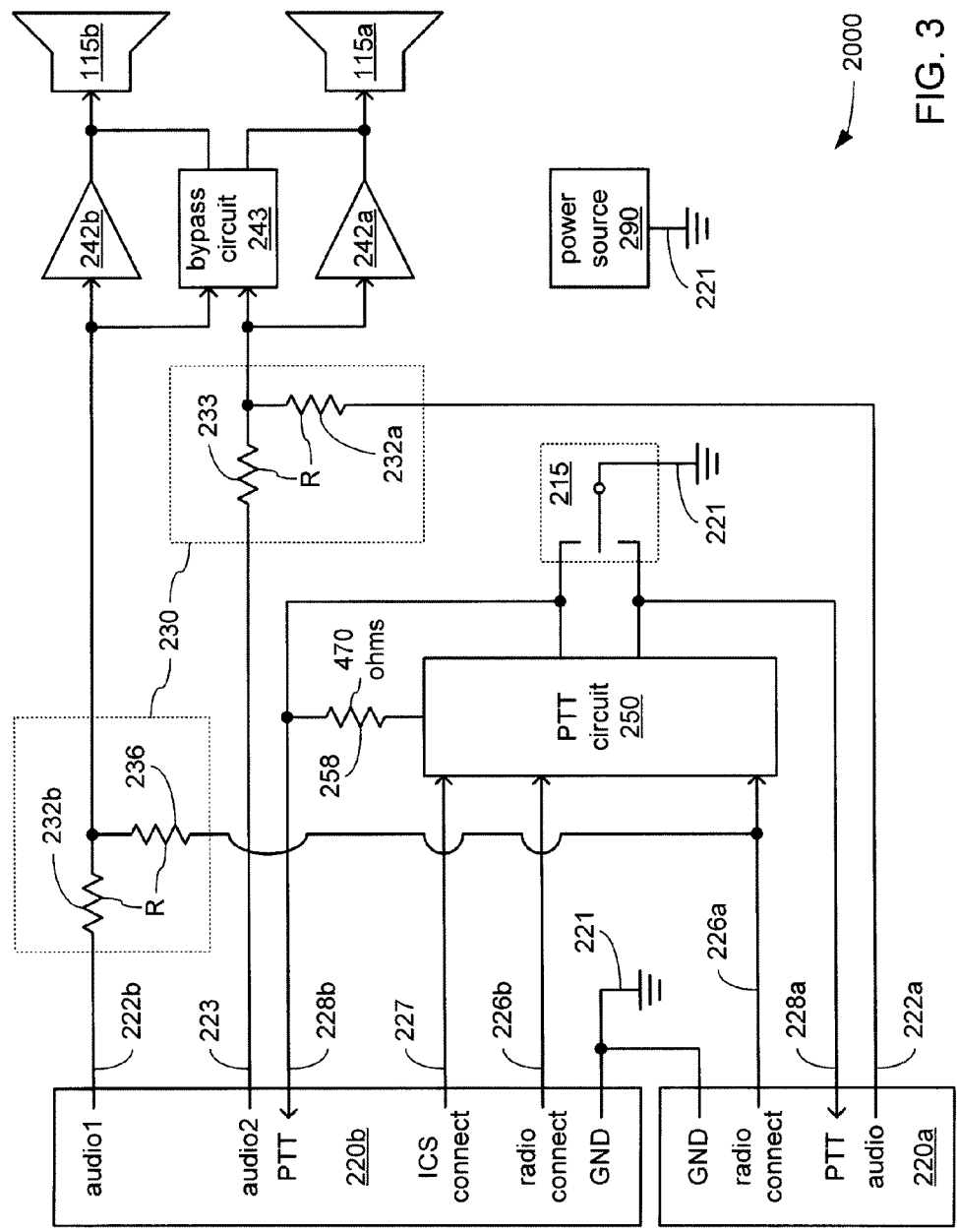
FIG. 3 is a block diagram of an electrical architecture employable in a portion of either variant of the headset of FIG. 1a or 1b.

FIG. 3 provides a schematic block diagram of portions of a possible electrical architecture 2000 that may be employed by the headset 1000. In other words, FIG. 3 provides specific depiction of some conductors and circuit components that are germane to the presentation and understanding of various aspects of the headset 1000, while not specifically depicting other conductors and circuit components in an effort to not distract from such presentation and understanding. For example, although those killed in the art will readily recognize that the acoustic drivers 115a and 115b require at least a second electrical connection (e.g., to a ground conductor) in addition to a connection by which audio is conveyed to them, and yet, such a second electrical connection is not depicted. Also for example, although the power source 290 is specifically depicted, its power connections to other components are not depicted to avoid distracting from the depiction of other conductors more germane to the discussion of what is presented herein. Further, although the headset 1000 incorporates the communications microphone 135 that is meant to be employed in enabling two-way audio communications, the communications microphone 135, its supporting components (e.g., a pre-amplifier, etc.) and its electrical connections (including the connectors 220a and 220b) are not depicted. Thus, this lack of depiction of the communications microphone 135, or its supporting components, or the electrical connections it would likely have through the connectors 220a and 220b should not be taken as an indication of the microphone 135 not being present or of either the communications microphone 135 or its supporting components not drawing electric power from the same power source(s) from which other components of the electrical architecture 2000 that are depicted draw their electric power.

As depicted, the depicted portions of the electrical architecture 2000 incorporate at least the acoustic drivers 115a and 115b; the PTT switch 215; the connectors 220a and 220b; multiple resistors 232a, 232b, 233, 236 and 258; a pair of audio amplifiers 242a and 242b; a bypass circuit 243; a PTT circuit 250; and the power source 290. The power source 290 provides power to at least the PTT circuit 250 and the audio amplifiers 242a and 242b, despite the lack of specific depiction of power conductors. Together, the resistors 232a, 232b, 233 and 236 make up a mixing circuit 230. In embodiments of the headset 1000 in which the acoustic drivers 115a and 115b are disposed within casings separate from the mixing circuit 230 and the PTT circuit 250, as might well be the case where the control box 200 is not integrated into the head assembly 100 as depicted in FIG. 1, the acoustic drivers 115a and 115b may be coupled to much of the rest of what is depicted in FIG. 3 through the cable 140. One or more of the bypass circuit 243 and the audio amplifiers 242a-b may be disposed either within the casing 210 or a portion of the head assembly 100 such that these components may be located towards either end of the cable 140. It is for this reason that the location of the cable 140 is not depicted relative to other components that are depicted in FIG. 3.

The connectors 220a and 220b incorporate ground contacts coupled to a ground conductor 221 to which various other components of the headset 1000 are also coupled, including the PTT switch 215 and the power source 290 (as specifically depicted). The connector 220a incorporates an audio contact coupled to an audio conductor 222a that is coupled to the resistor 232a, and the connector 220b incorporates both audio1 and audio2 contacts coupled to audio conductors 222b and 223 that are coupled to the resistors 232b and 233, respectively. The connector 220a incorporates a radio connect contact coupled to a radio connect conductor 226a that is coupled to the PTT circuit 250 and to the resistor 236, and the connector 220b may incorporate a radio connect contact coupled to a radio connect conductor 226b that may also be coupled to the PTT circuit 250. Also, the connector 220b incorporates an ICS connect contact coupled to an ICS connect conductor 227 that is also coupled to the PTT circuit 250. The connectors 220a and 220b each incorporate a PTT contact that is coupled to a PTT conductor 228a and 228b, respectively, that are each separately coupled to the PTT circuit 250 and coupled to different contacts of the PTT switch 215. The PTT conductor 228b is also coupled to the PTT circuit 250 in an additional coupling through the resistor 258.

The resistors 232a and 233 are coupled to each other with their common node being further coupled to an input of the audio amplifier 242a and an input of the bypass circuit 243. The resistors 232a and 233 cooperate to serve as a passive mixer of audio signals received via the audio conductor 222a and via the audio2 conductor 223, respectively. The resistors 232b and 236 are similarly coupled to each other with their common node being further coupled to an input of the audio amplifier 242b and another input of the bypass circuit 243. The resistors 232b and 236 function to subject audio signals received via the audio1 conductor 222b to the same degree of attenuation to which audio signals received via either the audio conductor 222a or the audio2 conductor 223 are subjected. This is done to balance the amplitudes of whatever audio is acoustically output to each ear of a user of the headset 1000 by the acoustic drivers 115a and 115b. As will be explained in greater detail, this balance in amplitude is constantly maintained by the mixing circuit 230 regardless of what audio devices are coupled to the connectors 220a-b and in spite of any loss of power from the power source 290.

Outputs of the audio amplifiers 242a and 242b are coupled to the acoustic drivers 115a and 115b, respectively. Separate outputs of the bypass circuit 243 are also coupled to each of the acoustic drivers 115a-b. During normal operation of the headset 1000 in which electric power is being provided to the audio amplifiers 242a and 242b by the power source 290, the audio amplifiers 242a and 242b amplify the audio signals received at their inputs and drive the acoustic drivers 115a and 115b, respectively, with amplified forms of those audio signals. Although not specifically shown, a manually-operable control may be incorporated into a portion of the headset 1000 that is coupled to the audio amplifiers 242a and 242b to adjust their gain, and thereby, adjust the amplitude with which the acoustic drivers 115a and 115b acoustically output audio to a user of the headset 1000. During operation of the headset 1000 in which electric power is not being provided by the power source 290 (e.g., where the power source 290 is depleted or disconnected from the headset 1000), the audio amplifiers 242a and 242b may be deprived of power and cease to function to provide amplification of audio signals. In response to this loss of electric power, the bypass circuit 243 electrically couples the common node of the resistors 232a and 233 to the acoustic driver 115a, and electrically couples the common node of the resistors 232b and 236 to the acoustic driver 115b, thereby permitting whatever audio devices that are coupled to the connectors 220a and/or 220b to more directly drive the acoustic drivers 115a and/or 115b with audio signals.

A common contact of the PTT switch 215 is coupled to the ground conductor 221. As previously discussed, the PTT switch 215 is biased by a spring (or living hinge or other mechanism) to a center position in which no audio device is selected to engage its PTT function (and away from either of two non-center positions). This position in which no audio device is selected corresponds to the common contact of the PTT switch 215 not being coupled to either of the contacts of the PTT switch that are coupled to either of the PTT conductors 228a or 228b. Operation of the PTT switch 215 by a user of the headset 1000 towards a non-center position to select and engage the PTT function of an audio device entails the common contact of the PTT switch 215 being coupled within the PTT switch 215 to the ground conductor 221, and thereby coupling one or the other of the PTT conductors 228a and 228b to the ground conductor 221, as well as the corresponding contact of one or the other of the connectors 220a and 220b, respectively. The PTT circuit 250, which is also coupled to the PTT conductors 228a and 228b, monitors the PTT conductors 228 and 228b for instances of one or the other of these conductors being coupled to the ground conductor 221 by user operation of the PTT switch 215. During normal operation of the headset 1000 in which electric power is being provided by the power source 290 to the PTT circuit 250, the PTT circuit 250 selectively augments the functionality of the PTT switch 215 in enabling a user to select and engage the PTT function of an audio device in response to various conditions that the PTT circuit 250 detects, as will be explained in greater detail. During operation of the headset 1000 in which electric power is not being provided by the power source 290, the PTT circuit 250 may be deprived of power and ceases to function to augment the functionality of the PTT switch 215 in the various ways that will be described. Despite such loss of electric power, the PTT switch 215 remains operable to enable a user of the headset 1000 to be moved to either of two non-center positions to select and engage the PTT functionality of either an audio device coupled to the connector 220a or an audio device coupled to the connector 220b.

FIGS. 4a, 4b, 4c, 4d and 4e, taken together, depict various possible coupling configurations of the headset 1000 in which different possible ones or possible combinations of the cables 300a-c, and different possible ones or possible combinations of audio devices are coupled to the connectors 220a and/or 220b of the headset 1000. It should be noted that what is depicted in all of FIGS. 4a-e is a subset of the portion of the electrical architecture 2000 that is depicted in FIG. 3. For the sake of reducing distraction and to enhance ease of understanding, this subset excludes some components that were depicted in FIG. 3, but which are not as germane to what is presented and discussed with regard to FIGS. 4a-e. FIGS. 4a-e and the following text that accompanies these figures are centered more on aspects of the interactions between various audio devices and various components of the mixing circuit 230 and the PTT circuit 250.

Figure 4A:
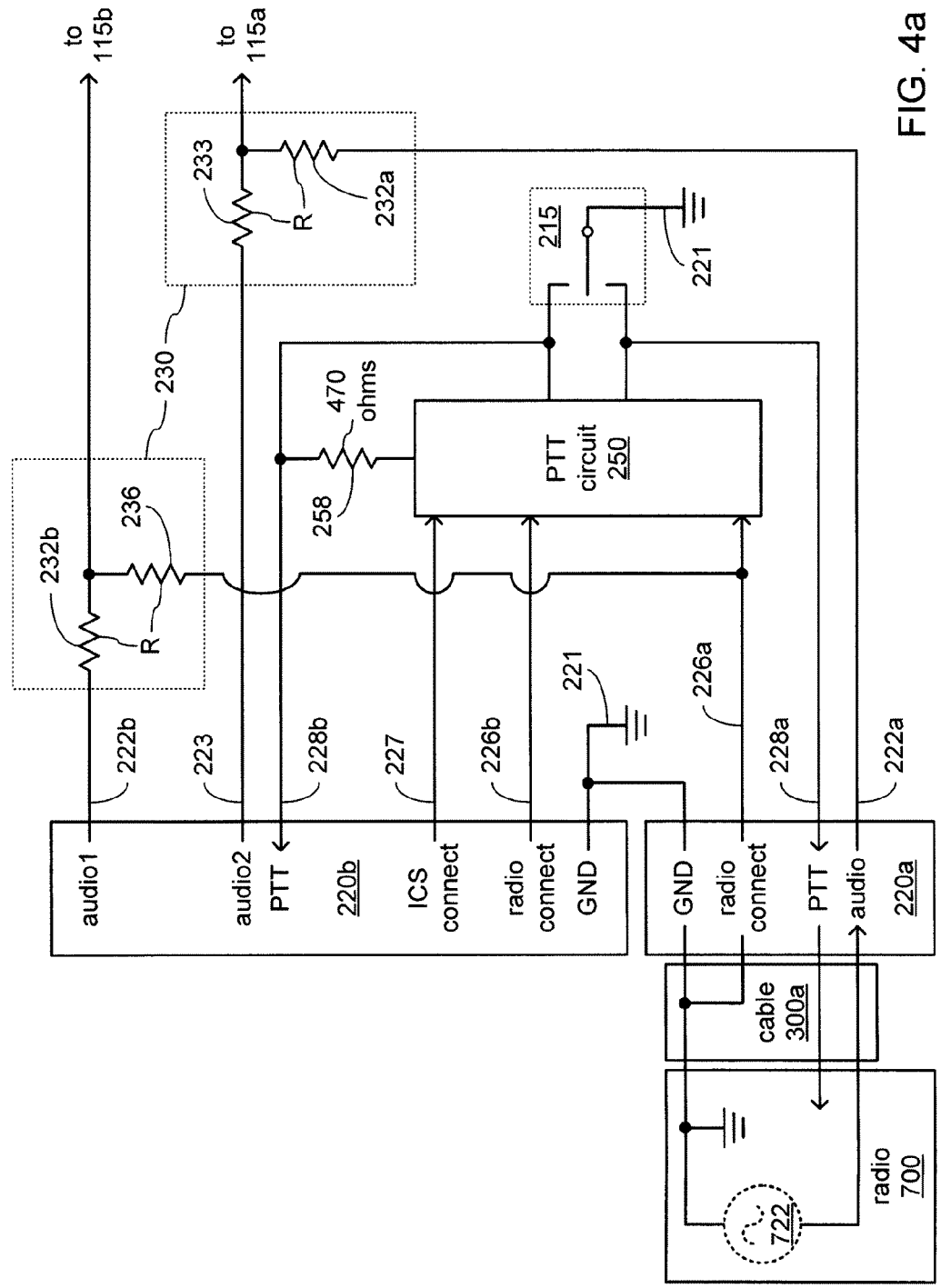
FIGS. 4a through 4e are each a portion of the block diagram of FIG. 3, with each additionally depicting the attachment of different ones and combinations of the cables of either variant of the headset of FIG. 1a or 1b, along with different ones and combinations of audio devices through those cables.

FIG. 4a depicts a coupling configuration in which the radio 700 is coupled to the connector 220a via the cable 300a, with no cable or audio device being coupled to the connector 220b. With the coupling of the cable 300a to the connector 220a, the radio connect conductor 226a is coupled to the ground conductor 221 in a conductive loop formed within the cable 300a. This grounding of the radio connect conductor 226a provides the PTT circuit 250 with an indication of the connection of at least the cable 300a to the connector 220a, thereby providing the PTT circuit 250 with an indication of there being an audio device capable of two-way audio communications (such as a radio) to the connector 220a. With the coupling of the radio 700 to the connector 220a via the cable 300a, the radio 700 is coupled to the ground conductor 221, the audio conductor 222a and the PTT conductor 228a through the cable 300a.

With all of these couplings made, the radio 700 is able to output an audio signal to the audio conductor 222a, which conveys the audio signal to the audio amplifier 242a and the bypass circuit 243 through the resistor 232a. Each of the resistors 232a and 233 preferably has a relatively small impedance (e.g., perhaps in the range of 10 ohms to 100 ohms, or thereabouts). With no audio device coupled to the connector 220b, the audio2 conductor 223 is not coupled to an audio device, resulting in the resistor 233 effectively presenting an infinite impedance at the common node of the resistors 232a and 233, despite its own small impedance. Thus, given the relatively high impedance of the input to the amplifier 242a (e.g., perhaps 10 Kohms to 100 Kohms), the audio signal conveyed via the audio conductor 222a is attenuated by the resistor 232a to only a relative minor degree, at most. With no audio device coupled to the connector 220b, no audio signal is provided on the audio1 conductor 222b, at all, and therefore, no audio is acoustically output by the acoustic driver 115b.

At times when a user of the headset 1000 wishes to engage the PTT function of the radio 700 to wirelessly transmit their voice to someone else, the user may operate the PTT switch 215 to a non-center position to cause the ground conductor 221 to be coupled to the PTT conductor 228a, which in turn, grounds a PTT input to a PTT circuit (not shown) of the radio 700 that is coupled via the cable 300a to the PTT conductor 228a. As those familiar with common practices in the design of two-way radios (including portable radios supporting two-way audio communications) will readily recognize, it is common practice to remotely cause a coupling of an input to a two-way radio to a ground conductor cause the PTT function of that radio to be engaged.

With no other audio device coupled to the connector 220b, the possibility exists that a user of the headset 1000 may become confused about which way to operate the PTT switch 215 (i.e., which non-center position to operate the PTT switch 215 towards) to select and engage the PTT function of the radio 700, and may mistakenly operate the PTT switch 215 in a wrong way (i.e., to a wrong non-center position) that uselessly couples the PTT conductor 228b to the ground conductor 221, instead of coupling the PTT conductor 228a to the ground conductor 221. As a result, the user may begin speaking into the communications microphone 135 (refer to FIG. 1) with the mistaken belief that they are transmitting their voice through the radio 700. To counteract this possible mistake that may be made by a user, the PTT circuit 250 is able to continuously monitor the radio connect conductors 226a and 226b, as well as the ICS connect conductor 227 to determine what audio devices are connected to the connectors 220a and 220b at any given time, and is able to augment the operation of the PTT switch 215 in ways that serve to address such concerns.

More specifically, the PTT circuit 250 monitors each of the radio connect conductors 226a and 226b for instances of either of these conductors being coupled to the ground conductor 221, which would indicate the connection of a radio to one or both of the connectors 220a and 220b, respectively. Further, the PTT circuit 250 monitors the ICS connect conductor 227 for instances of it being coupled to a positive voltage relative to the ground conductor 221 (e.g., +12V). With the radio 700 coupled to the connector 220a through the cable 300a, and with nothing coupled to the connector 220b, the PTT circuit 250 detects the coupling of the radio connect conductor 226a to the ground conductor 221, and detects the lack of a coupling of either the radio connect conductor 226b to the ground conductor 221 or the ICS connect conductor 227 to such a positive voltage. In response to these circumstances, the PTT circuit 250 augments the operation of the PTT switch 215 such that if a user of the headset mistakenly operates the PTT switch 215 to a wrong non-center position such that the PTT conductor 228b is coupled to the ground conductor 221 (instead of grounding the PTT conductor 228a), the PTT circuit 250 responds to the coupling of the PTT conductor 228b to ground by coupling the PTT conductor 228a to the ground conductor, itself, to provide the radio 700 with this otherwise missing indication to cause the PTT function of the radio 700 to be engaged. Thus, the user of the headset 1000 is able to cause their voice to be transmitted by the radio 700 to someone else, regardless of which way they operate the PTT switch 215 (i.e., regardless of which non-center position the PTT switch 215 is operated towards).

Figure 4B:
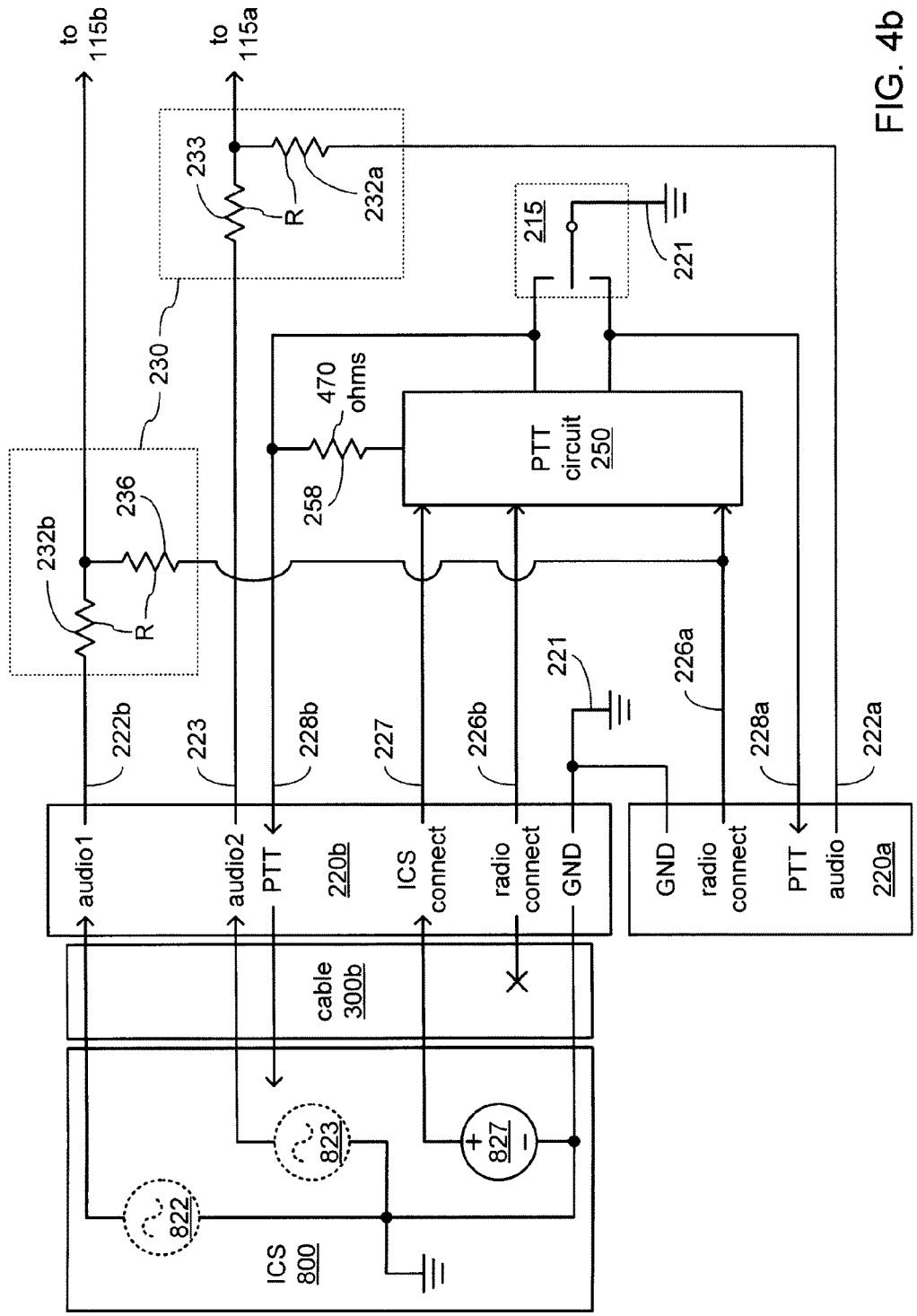

FIG. 4b depicts a coupling configuration in which the ICS 800 is coupled to the connector 220b via the cable 300b, with no cable or audio device being coupled to the connector 220a. With the coupling of the ICS 800 to the connector 220b via the cable 300b, the ICS 800 is coupled to the ground conductor 221, the audio1 conductor 222b, the audio2 conductor 223, the ICS connect conductor 227 and the PTT conductor 228b through the cable 300b.

With all of these couplings made, the ICS 800 is able to output audio signals to the audio1 conductor 222b and the audio2 conductor 223, which convey these audio signals to the audio amplifiers 242a and 242b through the resistors 232b and 233, respectively, as well as to the bypass circuit 243. As with the resistors 232a and 233, preferably, each of the resistors 232b and 236 has a relatively small impedance (e.g., perhaps in the range of 10 ohms to 100 ohms, or thereabouts). With no audio device coupled to the connector 220a, the audio conductor 222a is not coupled to an audio device and the radio connect conductor 226 is not coupled to the ground conductor 221, resulting in the resistor 232a effectively presenting an infinite impedance at the common node of the resistors 232a and 233, and in the resistor 236 similarly presenting an infinite impedance at the common node of the resistors 232b and 236. Again, given the relatively high impedances of the inputs to the amplifiers 242a and 242b, the audio signals conveyed via the audio1 conductor 222b and the audio2 conductors 223 are attenuated by the resistors 232b and 233, respectively, to only a minor degree. With no audio device coupled to the connector 220a, only audio provided by the ICS 800 through the connector 220b is acoustically output by the acoustic drivers 115a and 115b.

At times when a user of the headset 1000 wishes to engage the PTT function of the ICS 800 to wirelessly transmit their voice to someone else, the user may operate the PTT switch 215 to cause the ground conductor 221 to be coupled to the PTT conductor 228b, which in turn, grounds a PTT input to a PTT circuit (not shown) of the ICS 800 that is coupled via the cable 300b to the PTT conductor 228b. As those familiar with common practices in the design of vehicle intercom systems will readily recognize, it is common practice to couple a vehicle intercom system to a vehicle radio to enable a user of a headset coupled to a vehicle intercom system to be able to use such a vehicle radio through that vehicle intercom system. To enable a user of a vehicle intercom system that is also coupled to a vehicle radio to select between engaging the PTT function of the vehicle intercom system and the PTT function of the vehicle radio, a widely accepted approach to operating a PTT signal input to such a vehicle intercom system to signal whether to engage the PTT function of one or the other has arisen over time in which that signal input is coupled directly to a ground conductor to engage the PTT function of the vehicle radio, and is coupled to ground through a 470 ohm resistor to engage the PTT function of the vehicle intercom system.

With no other audio device coupled to the connector 220a, the PTT conductor 228a is not coupled to an input of any audio device, and so if the user operates the PTT switch 215 in a manner that couples the PTT conductor 228a to the ground conductor 221, nothing is signaled to any audio device. To counteract this situation in which such operation of the PTT switch 215 serves no purpose and to enable a user of the headset 1000 to choose between engaging the PTT function of either the ICS 800 or the vehicle radio 850 coupled to the ICS 800 (if the vehicle radio 850 is present and coupled to the ICS 800), the PTT circuit 250 is again able to augment the operation of the PTT switch 215, and to do so automatically without user input to trigger it to do so.

Again, the PTT circuit 250 monitors each of the radio connect conductors 226a and 226b for instances of either of these conductors being coupled to the ground conductor 221, and monitors the ICS connect conductor 227 for instances of it being coupled to a positive voltage relative to the ground conductor 221. With the ICS 800 coupled to the connector 220b through the cable 300b, and with nothing coupled to the connector 220a, the PTT circuit 250 detects the coupling of the ICS connect conductor 227 to a positive voltage relative to the ground conductor 221 (provided by a power source 827 of the ICS 800), and detects the lack of a coupling of either the radio connect conductors 226a or 226b to the ground conductor 221. In response to these circumstances, the PTT circuit 250 augments the operation of the PTT switch 215 to allow the user to select and engage the PTT function of the ICS 800 by operating the PTT switch 215 to couple the PTT conductor 228a to the ground conductor 221 (instead of grounding the PTT conductor 228b). The PTT circuit 250 monitors the PTT conductor 228a and responds to its being coupled to the ground conductor 221 by the user's use of the PTT switch 215 by coupling the PTT conductor 228b to the ground conductor 221 through the resistor 258, which is a 470 ohm resistor that provides the ICS 800 with the correct indication required to cause the PTT function of the ICS 800 to be engaged. Thus, the user is enabled by this augmented function of the PTT switch 215 to select and engage the PTT function of one or the other of the ICS 800 and the vehicle radio 850 depending on how they operate the PTT switch 215 (i.e., depending on which non-center position the PTT switch 215 is operated towards by the user).

Figure 4C:
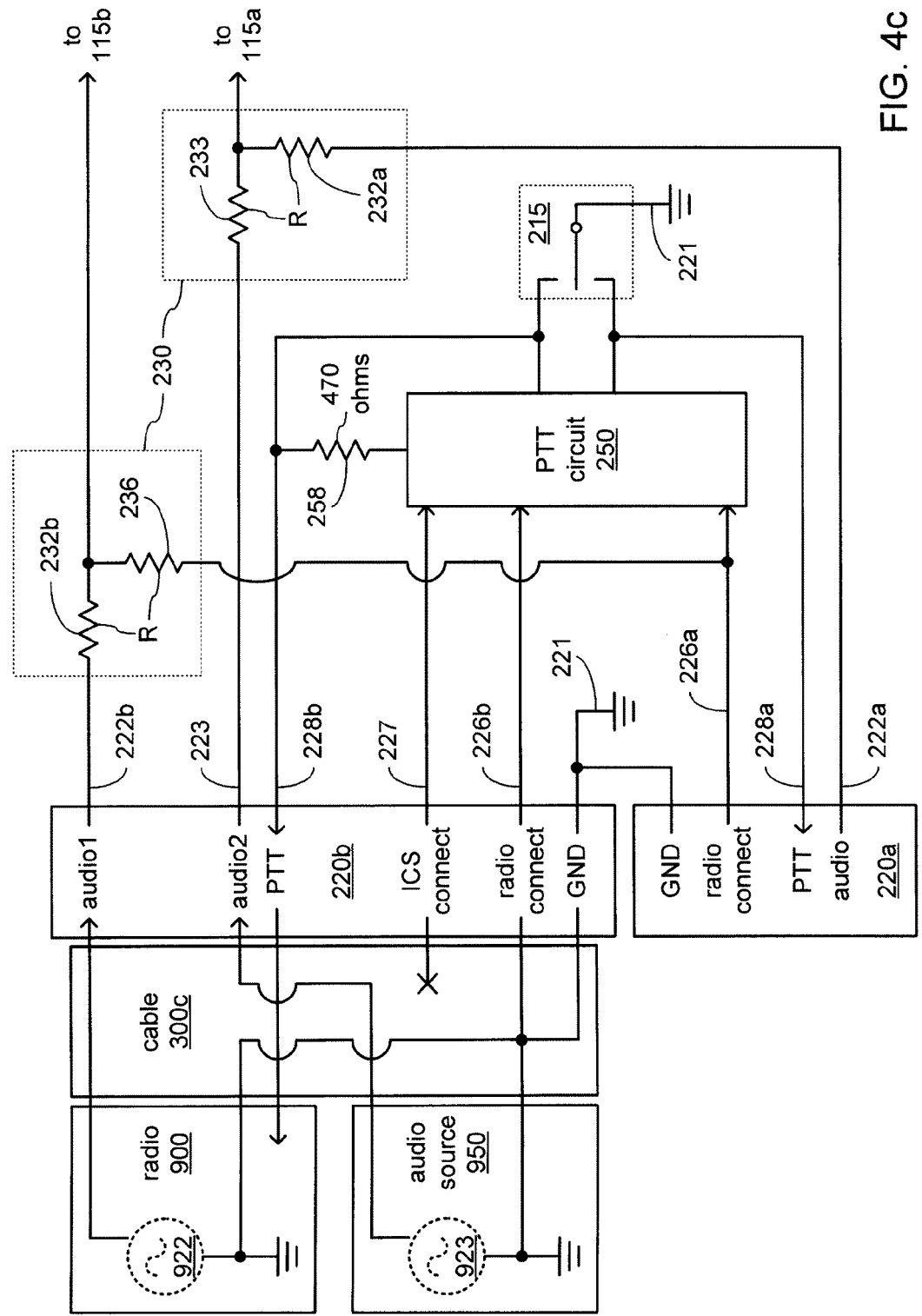

FIG. 4c depicts a coupling configuration in which one or both of the radio 900 and the audio source 950 are coupled to the connector 220b via the cable 300c, with no cable or audio device being coupled to the connector 220a. With the coupling of the cable 300c to the connector 220a, the radio connect conductor 226b is also coupled to the ground conductor 221 in a conductive loop formed within the cable 300c. The grounding of the radio connect conductor 226b provides the PTT circuit 250 with an indication of the connection of at least the cable 300c to the connector 220b, thereby providing the PTT circuit 250 with an indication of there being an audio device capable of two-way audio communications (such as a radio) to the connector 220b. Where the radio 900 is coupled to the connector 220b via the cable 300c, the radio 900 is coupled to the ground conductor 221, the audio1 conductor 222b and the PTT conductor 228b through the cable 300c. Where the audio source 950 is coupled to the connector 220b via the cable 300c, the audio source 950 is coupled to the ground conductor 221 and the audio2 conductor 223.

With all of these couplings made, the radio 900 (if present) is able to output an audio signal to the audio1 conductor 222b, which conveys the audio signal to the audio amplifier 242b and the bypass circuit 243 through the resistor 232b. Also, with all of these couplings made, the audio source 950 (if present) is able to output an audio signal to the audio2 conductor 223, which conveys the audio signal to the audio amplifier 242a and the bypass circuit 243 through the resistor 233. Again, with no audio device coupled to the connector 220a, the audio conductor 222a is not coupled to any source of audio and the radio connector conductor 226 is not coupled to the ground conductor 221. Thus, the resistors 232a and 236 are caused to effectively present infinite impedances, and the resistors 232b and 233 imposed little, if any, attenuation on audio signals conveyed via the audio1 conductor 222b and the audio2 conductor 223. Therefore, only audio provided by the audio source 950 and the radio 900 through the connector 220b is acoustically output by the acoustic drivers 115a and 115b, respectively.

At times when a user of the headset 1000 wishes to engage the PTT function of the radio 900 to wirelessly transmit their voice to someone else, the user may operate the PTT switch 215 to cause the ground conductor 221 to be coupled to the PTT conductor 228b, which in turn, grounds a PTT input to a PTT circuit (not shown) of the radio 900 that is coupled via the cable 300c to the PTT conductor 228b.

With no other audio device coupled to the connector 220a, the possibility exists that a user of the headset 1000 may become confused about which way to operate the PTT switch 215 to select and engage the PTT function of the radio 900, and may mistakenly operate the PTT switch 215 in a wrong way (i.e., towards a wrong non-center position) that uselessly couples the PTT conductor 228a to the ground conductor 221, instead of coupling the PTT conductor 228b to the ground conductor 221. To counteract this possible mistake that may be made by a user, the PTT circuit 250 is again able to augment the operation of the PTT switch 215 in ways that serve to address such concerns.

Again, the PTT circuit 250 monitors each of the radio connect conductors 226a and 226b for instances of either of these conductors being coupled to the ground conductor 221, and monitors the ICS connect conductor 227 for instances of it being coupled to a positive voltage relative to the ground conductor 221. With the radio 900 coupled to the connector 220b through the cable 300c, and with nothing coupled to the connector 220a, the PTT circuit 250 detects the coupling of the radio connect conductor 226b to the ground conductor 221, and detects the lack of a coupling of either the radio connect conductor 226a to the ground conductor 221 or the ICS connect conductor 227 to such a positive voltage. In response to these circumstances, the PTT circuit 250 augments the operation of the PTT switch 215 such that if a user of the headset mistakenly operates the PTT switch 215 such that the PTT conductor 228a is coupled to the ground conductor 221 (instead of coupling the PTT conductor 228b to the ground conductor 221), the PTT circuit 250 responds to the coupling of the PTT conductor 228a to the ground conductor 221 by coupling the PTT conductor 228b to the ground conductor 221, itself, to provide the radio 900 with the otherwise missing indication to cause the PTT function of the radio 900 to be engaged. Thus, the user of the headset 1000 is able to cause their voice to be transmitted by the radio 900 to someone else, regardless of which way they operate the PTT switch 215 (i.e., regardless of which non-center position they operate the PTT switch 215 towards).

Figure 4D:
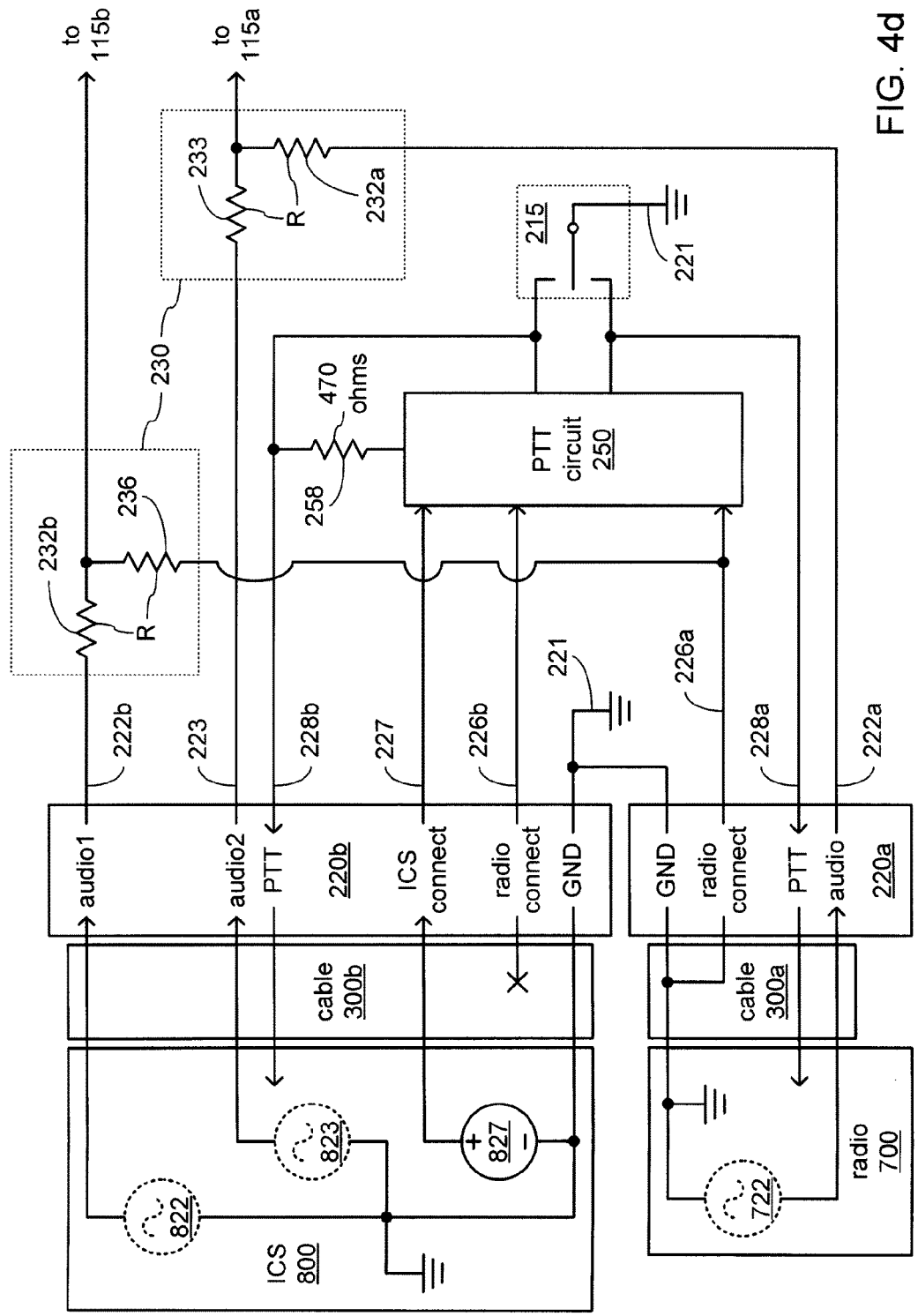
Figure 4E:
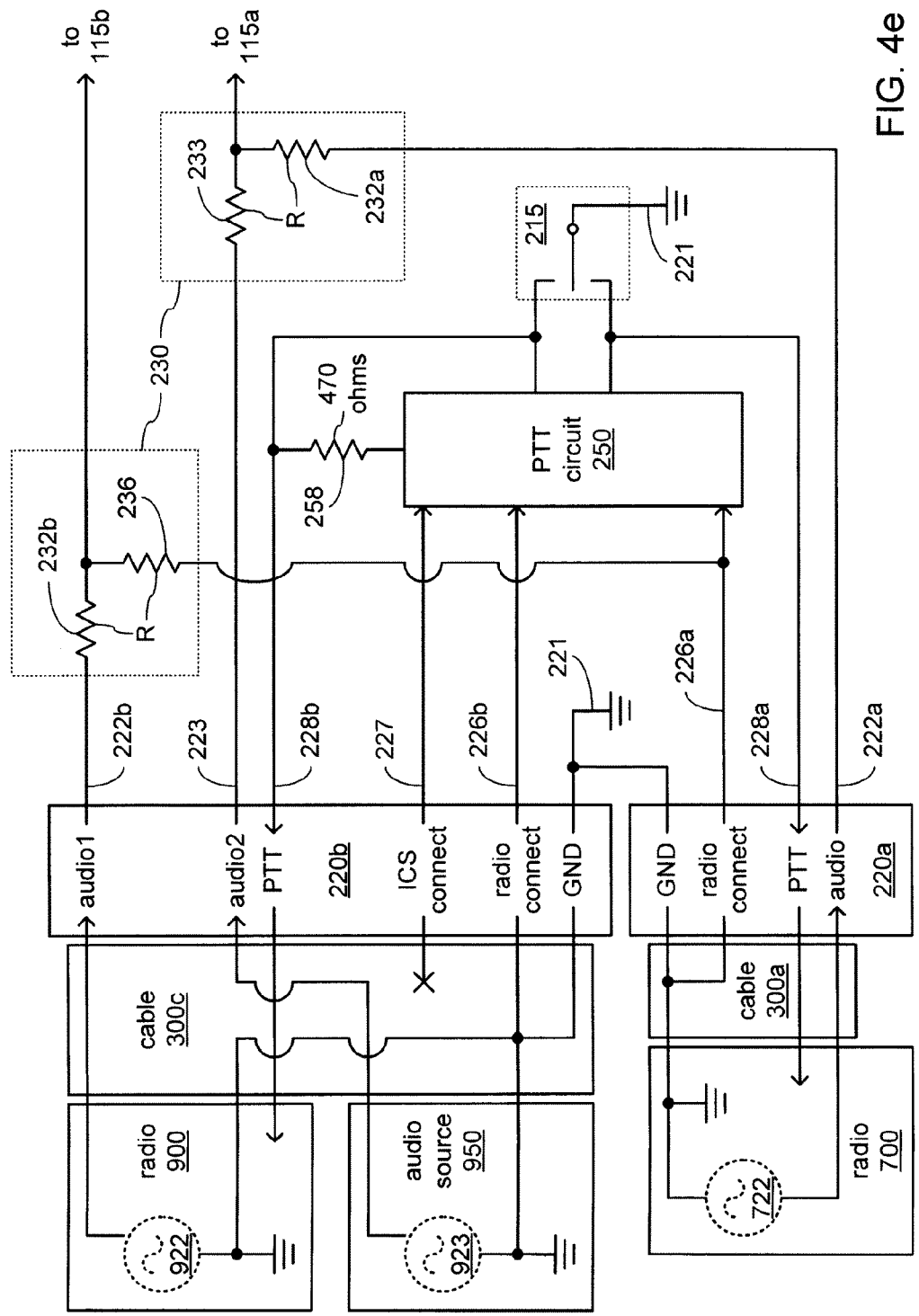

Unlike the coupling configurations depicted in FIGS. 4a-c in which audio devices were coupled to only one of the connectors 220a and 220b at any time, the coupling configurations depicted in FIG. 4d-e have audio devices coupled to both of the connectors 220a and 220b, simultaneously. As will be made clear, whereas the mixing circuit 230 did not perform any mixing of audio signals from multiple audio devices in the coupling configurations of FIGS. 4a-c, in response to the simultaneous coupling of audio devices to both of these connectors in the coupling configurations of FIGS. 4d-e, the mixing circuit 230 mixes audio signals provided by multiple audio devices. As will also be made clear, whereas the PTT circuit 250 responded to the connection of audio devices to one of the connectors 220a and 220b by augmenting the functionality of the PTT switch 215 to improve its use with audio devices coupled to only one of these connectors, in response to the simultaneous coupling of audio devices to both of these connectors, the PTT ceases to augment the functionality of the PTT switch 215. Thus, as will be made clear, the mixing circuit 230 and the PTT circuit 250 have distinct modes in which they function differently at least partly in response to whether audio devices are coupled to one or both of the connectors 220a and 220b. Also, as is made clear in the coupling configurations depicted in each of FIGS. 4a-c, the nature of the augmentation of functionality of the PTT switch 215 provided by the PTT circuit 250 changed in response to the type of audio device coupled to one or the other of the connectors 220a and 220b, and in response to which of these connectors an audio device is coupled. These changes in the functionality provided by the mixing circuit 230 and the PTT circuit 250 are automatic in the sense that a user of the headset 1000 need not operate any form of manually-operable control to cause these changes to occur. Instead, the user simply couples the headset 1000 to whatever audio devices the user chooses, and the mixing circuit 230 and the PTT circuit 250 change their functional behavior based solely on what audio devices have been coupled to the headset 1000 and to which of the connectors 220a and 220b.

FIG. 4d depicts a coupling configuration in which the radio 700 is coupled to the connector 220a via the cable 300a and the ICS 800 is coupled to the connector 220b via the cable 300b. With the coupling of the cable 300a to the connector 220a, the radio connect conductor 226a is coupled to the ground conductor 221 in a conductive loop formed within the cable 300a. With the coupling of the radio 700 to the connector 220a via the cable 300a, the radio 700 is coupled to the ground conductor 221, the audio conductor 222a and the PTT conductor 228a through the cable 300a. With the coupling of the ICS 800 to the connector 220b via the cable 300b, the ICS 800 is coupled to the ground conductor 221, the audio1 conductor 222b, the audio2 conductor 223, the ICS connect conductor 227 and the PTT conductor 228b through the cable 300b. The radio connect conductor 226b of the connector 220b is not coupled.

With all of these couplings made, the radio 700 is able to output an audio signal to the audio conductor 222a, and the ICS 800 is able to output audio signals to the audio1 conductor 222b and the audio2 conductor 223. With audio signals being provided on both the audio conductor 222a and the audio2 conductor 223, the resistors 232a and 233 cooperate as a passive mixer to mix the audio signals provided on these two conductors, with the resulting mixed audio signal being conveyed from the common node of these two resistors to the acoustic driver 115a through the audio amplifier 242a or the bypass circuit 243, as previously discussed. As those familiar with the electrical characteristics of audio signals typically output by such audio devices as radios and intercom systems will readily recognize, such an audio signal can be regarded as being driven by a voltage source incorporated into the audio device that outputs that audio signal. Thus, as depicted, the radio 700 can be regarded as driving the audio conductor 222a with a voltage source 722, and the ICS 800 can be regarded as driving the audio1 conductor 222b and the audio2 conductor 223 with voltage sources 822 and 823, respectively, all of which have one of their output terminals coupled to the ground conductor 221. As those skilled in the art will readily recognize, such voltage sources typically have little or no resistance between their output terminals such that each of the voltage sources 722, 822 and 823 can almost be regarded as a short to the ground conductor 221. Thus, with both the audio conductor 222a and the audio2 conductor 223 being coupled to such audio sources (which can be regarded as powers sources with low impedance), each one of these conductors and their associated audio source effectively completes an attenuating network through the other of these conductors and its associated audio source. The result is a mutual attenuating current flow effect that enables the cooperation of the resistors 232a and 233 to function as a passive mixer of the audio signals provided via these two conductors.

In a very similar way, with an audio signal being provided on the audio conductor 222b and with the radio connect conductor 226a being coupled to the ground conductor 221, the resistors 232b and 236 cooperate in a manner very much like the resistors 232a and 233, essentially as another passive mixer to mix the audio provided on the audio conductor 222b with the ground coupling provided through the radio connect conductor 226a, with the resulting mixed audio signal being conveyed from the common node of these two resistors to the acoustic driver 115b through the audio amplifier 242b or the bypass circuit 243, as previously discussed.

Beyond simply mixing audio signals, the manner in which the resistors 232a and 233 are coupled together and cooperate, and the manner in which the resistors 232b and 236 are coupled together and cooperate result in the mixing circuit 230 serving to aid in balancing the amplitudes of all three of the audio signals provided on the audio conductor 222a, the audio1 conductor 222b and the audio2 conductor 223. Indeed, to enable this balancing, it is preferred that all four of the resistors 232a, 232b, 233 and 236 have the same resistive value (i.e., a common resistance R, as depicted). As a result, the amplitude of the audio acoustically output to the ears of a user of the headset 1000 is balanced between what is acoustically output to one ear versus what is acoustically output to the other. The manner in which these resistors are coupled together and cooperate also serve to provide an advantageous proportion of mixing between the audio signals provided on the audio conductor 222a and the audio2 conductor 223, such that one ear of a user is provided with an even mixture of these two audio signals, while the other ear is provided solely with the audio signal provided on the audio1 conductor 222b. It has been determined to be desirable to generally provide audio from each radio to only one ear of a user, while providing audio from an intercom system to both ears. This has been found to be advantageous in enabling a user to quickly distinguish things said to the user by individuals over a radio who are probably at a location where the user cannot see those individuals from things said to the user by individuals over an intercom system who are probably in the same vehicle with user (or otherwise in close proximity with the user such that the user is able to see them). It has also been determined to be desirable to provide audio from two different radios to separate ears of a user, as it has been found to be advantageous in enabling a user to quickly determine which radio a user is hearing someone through so as to more easily maintain a clear mental picture of the locations of different individuals who may be talking to the user at the same time. Further, this use of these resistors in forming passive mixers enables the mixing circuit 230 to function without electric power from the power source 290 (or any other power source) such that loss of electric power will not impair the operation of the mixing circuit 230.

With the coupling of audio devices to both of the connectors 220a and 220b, the PTT circuit 250 generally responds by ceasing to augment the functionality of the PTT switch 215. More precisely, the PTT circuit 250 detects the coupling of the ICS connect conductor 227 to a positive voltage relative to the ground conductor 221, detects the coupling of the radio connect conductor 226a to the ground conductor 221, and determines that audio devices supporting two-way audio communications have been coupled to each of the connectors 220a and 220b. In response, the PTT circuit 250 refrains from augmenting the functionality of the PTT switch 215. This enables a user of the headset 1000 to simply operate the PTT switch 215 towards one non-center position or the other to couple the ground conductor 221 to either the PTT conductor 228a to engage the PTT function of the radio 700 or the PTT conductor 228b to engage the PTT function of the radio 850 (through the ICS 800).

FIG. 4e depicts a coupling configuration in which the radio 700 is coupled to the connector 220a via the cable 300a, and in which one or both of the radio 900 and the audio source 950 are coupled to the connector 220b via the cable 300c. With the coupling of the cables 300a and 300c to the connectors 220a and 220b, respectively, the radio connect conductors 226a and 226b are both coupled to the ground conductor 221 in conductive loops formed within the cables 300a and 300c, respectively. With the coupling of the radio 700 to the connector 220a via the cable 300a, the radio 700 is coupled to the ground conductor 221, the audio conductor 222a and the PTT conductor 228a through the cable 300a. Where the radio 900 is coupled to the connector 220b via the cable 300c, the radio 900 is coupled to the ground conductor 221, the audio1 conductor 222b and the PTT conductor 228b through the cable 300c. Where the audio source 950 is coupled to the connector 220b via the cable 300c, the audio source 950 is coupled to the ground conductor 221 and the audio2 conductor 223. The ICS connect conductor 227 of the connector 220b is not coupled.

With all of these couplings made, the radio 700 is able to output an audio signal to the audio conductor 222a, the radio 900 (if present) is able to output an audio signal to the audio1 conductor 222b, and the audio source 950 (if present) is able to output an audio signal to the audio2 conductor 223. With audio signals being provided on both the audio conductor 222a and the audio2 conductor 223, the resistors 232a and 233 cooperate as a passive mixer to mix the audio signals provided on these two conductors, with the resulting mixed audio signal being conveyed from the common node of these two resistors to the acoustic driver 115a through the audio amplifier 242a or the bypass circuit 243, as previously discussed at length in reference to FIG. 4d. Also, with an audio signal being provided on the audio conductor 222b and with the radio connect conductor 226a being coupled to the ground conductor 221, the resistors 232b and 236 cooperate in a manner very much like the resistors 232a and 233, essentially as another passive mixer to mix the audio provided on the audio conductor 222b with the coupling to the ground conductor 221 provided through the radio connect conductor 226a, with the resulting mixed audio signal being conveyed from the common node of these two resistors to the acoustic driver 115b through the audio amplifier 242b or the bypass circuit 243, as also previously discussed at length in reference to FIG. 4d.

Where the audio source 950 is present, the manner in which the resistors 232a and 233 are coupled together and cooperate also serve to provide an advantageous proportion of mixing between the audio signals provided on the audio conductor 222a and the audio2 conductor 223, such that one ear of a user is provided with an even mixture of these two audio signals. As previously discussed, the audio source 950 may any of a variety of audio devices, i.e., devices providing an audio output, including and not limited to, a talking GPS device, a talking environmental sensing device (e.g., a talking chemical, biological or radiological hazard sensing device), etc. Where the radio 900 is present, the other ear is provided solely with the audio signal provided on the audio1 conductor 222b. Again, where the radio 900 is present along with the radio 700 such that a user of the headset 1000 is interacting with both radios, it has been determined to be desirable to generally provide audio from each of these radios to only one ear (a separate ear for each) of a user. Again, this has been found to be advantageous in enabling a user to quickly determine which radio a user is hearing someone through so as to more easily maintain a clear mental picture of the locations of different individuals who may be talking to the user at the same time.

With the coupling of audio devices to both of the connectors 220a and 220b, the PTT circuit 250 generally responds by ceasing to augment the functionality of the PTT switch 215. More precisely, the PTT circuit 250 detects the coupling of both of the radio connect conductors 226a and 226b to the ground conductor 221, and determines that audio devices supporting two-way audio communications have been coupled to each of the connectors 220a and 220b. In response, the PTT circuit 250 refrains from augmenting the functionality of the PTT switch 215. This enables a user of the headset 1000 to simply operate the PTT switch 215 towards one non-center position or another to couple the ground conductor 221 to either the PTT conductor 228a to engage the PTT function of the radio 700 or the PTT conductor 228b to engage the PTT function of the radio 900 (if present).

Although much of the discussion herein has been focused on the depicted example of the headset 1000, in which all three of the passive mixer 230, the PTT switch 215, and the PTT circuit 250 have been depicted and discussed as being present in the same device, it is important to note (and it will be readily appreciated by those skilled in the art) that each of the passive mixer 230, the PTT switch 215 and the PTT circuit 250 may be separately incorporated into different devices, or one of these three may be absent in a device into which the other two are incorporated. In other words, this presentation of all three of the passive mixer 230, the PTT switch 215 and the PTT circuit 250 into the same headset 1000 is meant to serve only as a single example that is presented to facilitate providing an explanation of the structure and function of each, and should not be taken as indicating that any one of these necessarily requires one or both of the others. For example, and as suggested by FIGS. 5a and 6a, it is envisioned that the passive mixer 230 may be employed in headphones that provide no facility, whatsoever, for the user of the headphones to engage any PTT function of any device to which those headphones may be coupled. Also for example, and as suggested by FIGS. 5b and 6b, it is envisioned that the PTT circuit 250 may be employed with a hand-held microphone or a microphone on a desk stand at a radio station or other environment with stationary speakers being provided in place of any form of headphones or headsets for listening to received radio signals.

It should also be noted that although the radios 700 and 900 are presented as coupling a conductor coupled to one or the other of the connectors 220a and 220b to the ground conductor 221 when coupled to one of these connectors, and although the ICS 800 is presented as coupling a conductor coupled to the connector 220b to a power source of the ICS 800 when coupled to the connector 220b, these choices of manner in which the coupling of the radio 700, the radio 900 and the ICS 800 is signaled to the PTT circuit 250 representing arbitrary choices. More specifically, other embodiments are possible in which one of the radio 700 or 900 couples a conductor that is coupled to one or the other of the connectors 220a and 220b to a power source of that one of the radio 700 or 900 when that one of the radio 700 or 900 is coupled to that one of the connectors 220a and 220b. However, it is deemed preferable to avoid the possibility of draining the often very limited power sources of a radio, especially a portable radio, allowing any component of the headset 1000 (including the PTT circuit 250) to draw power from such power sources. In contrast, it is deemed desirable to allow the ICS 800 to provide a coupling to a power source of the ICS 800 when coupled to the headset 1000. In addition to the provision of power serving as a signal to the PTT circuit 250 that the ICS 800 is coupled to the headset 1000, the fact the ICS 800 is likely to have access to a much higher capacity power supply of a vehicle makes it potentially desirable to draw electric power from the ICS 800 in lieu of depleting the power source 290, which may also be of highly limited capacity.

Figure 5A:
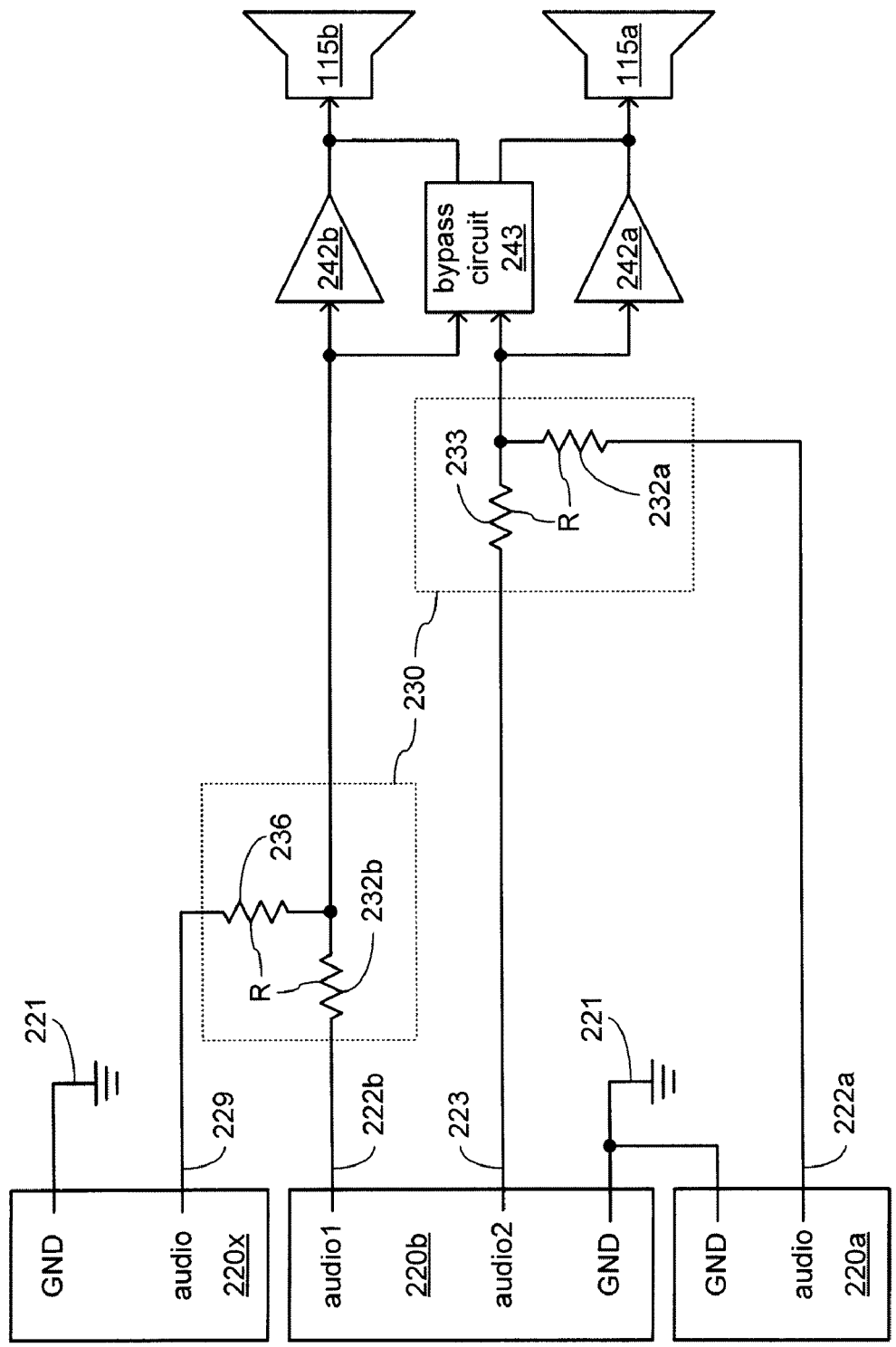
FIGS. 5a and 5b are block diagrams of alternate architectures providing a subset of the function of the architecture of FIG. 3.

FIG. 5a depicts a variant of the electrical architecture 2000 of FIG. 3 in which an alternate form of the mixing circuit 230 is depicted, as well as the audio amplifiers 242a and 242b, the bypass circuit 243 and the acoustic drivers 115a and 115b. Also depicted are the connectors 220a and 220b, along with an additional connectors 220x. In this depicted alternate form of the mixing circuit 230, the resistor 236 that had been coupled to the radio coupled conductor 226a is, instead, coupled through to an audio conductor 229 to a corresponding audio contact of the connector 229. In this way, the mixing circuit 230 may be employed to mix the audio of an ICS (e.g., the ICS 800) coupled to the connector 220b and up to two radios (e.g., the radios 700 and 900) separately coupled to the connectors 220a and 220x such that the audio of a radio coupled to the connector 220a is mixed with one channel of audio of an ICS coupled to the connector 220b for acoustic output by the acoustic driver 115a, and such that the audio of a radio coupled to the connector 22x is mixed with the other channel of audio of an ICS coupled to the connector 220b for acoustic output by the acoustic driver 115b.

Figure 5B:
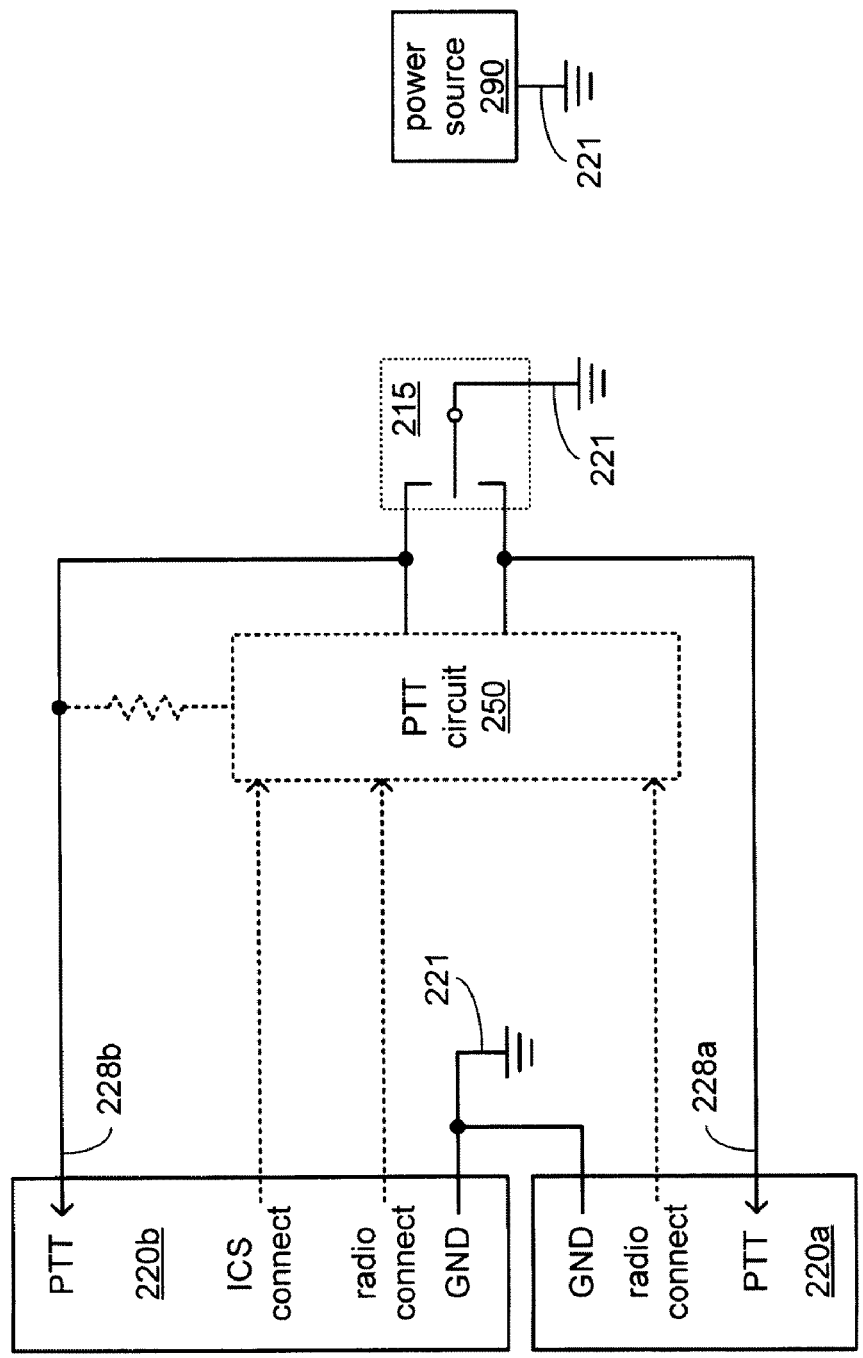

FIG. 5b depicts a variant of the electrical architecture 2000 of FIG. 3 in which audio mixing functionality is not provided, and in which the PTT circuit 250 either may or may not present (as suggested the PTT circuit 250 and associated resistor being depicted with dotted lines).

Figure 6B:
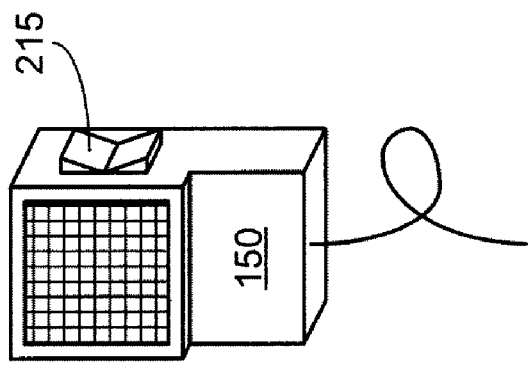
FIGS. 6a and 6b are perspective diagrams of alternate devices providing a subset of the function of either variant of the headset of FIG. 1a or 1b.
Figure 6A:
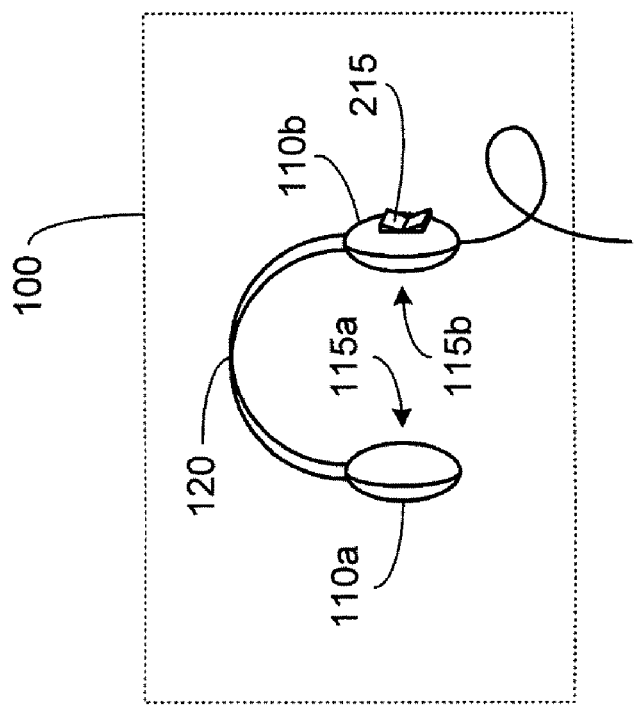

FIG. 6a depicts a variant of the head assembly 100 of FIG. 1b into which the communications microphone 135 is not incorporated. This depiction of this variant is intended to make clear that the functionality of the PTT switch 215 and possibly also of the mixing circuit 230 (which if present, may be incorporated into a portion of the head assembly 100) need not be accompanied by the communications microphone 135, which may be incorporated into a separate device.

FIG. 6b depicts a hand-held microphone 150 into which at least the PTT switch 215 is incorporated, perhaps also with the PTT circuit 250. This depiction of this hand-held microphone is intended to make clear that the functionality of the PTT switch 215 and possibly also of the PTT circuit 250 (which if present, may be incorporated into the hand-held microphone 150) need not be accompanied by the mixing circuit 230.

It should be still further noted that although much of what has been depicted and discussed herein entails wired connections between devices and/or components of devices having one or more of the passive mixer 230, the PTT switch 215 and the PTT circuit 250, embodiments in which wireless (e.g., radio frequency or infrared) communications are employed in place of one or more of such wired connections. By way of example, an alternate form of the control box 200 may be coupled to one or more other components of the headset 1000 via a wireless linkage, thereby allowing the control box 200 to be mounted to a piece of machinery, a location in the interior of a vehicle, or on a portion of a weapon in a manner that does not encumber a user of the headset 1000 with a wired connection to the control box 200.

Other embodiments and implementations are within the scope of the following claims and other claims to which the applicant may be entitled.

The invention claimed is:

1. An apparatus comprising:
   a first connector to enable the coupling of a first audio device to the apparatus;
   a second connector to enable the coupling of a second audio device to the apparatus; and
   a push-to-talk (PTT) switch having a center position, operable to a first non-center position from the center position to engage a PTT function of the first audio device at a time when the first audio device is coupled to the apparatus, operable to a second non-center position from the center position to engage a PTT function of the second audio device at a time when the second audio device is coupled to the apparatus, mechanically structured to prevent the PTT functions of both of the first and second audio devices from being simultaneously engaged, and in which a biasing force tends to bias the PTT switch towards the center position from the first and second non-center positions.

2. The apparatus of claim 1, wherein the PTT switch comprises a rocker switch having a first surface and a second surface, wherein the PTT switch is operable to the first non-center position by pressing on the first surface and is operable to the second non-center position by pressing on the second surface.

3. The apparatus of claim 1, wherein the PTT switch further comprises a spring providing at least a portion of the biasing force to tend to bias the PTT switch toward the center position from at least one of the first and second non-center positions.

4. The apparatus of claim 1, further comprising a communications microphone to detect speech to be conveyed to at a remotely located person through the PTT function of one of the first and second audio devices of which the PTT function is engaged through operation of the PTT switch.

5. The apparatus of claim 1, wherein the apparatus comprises a headset having at least one acoustic driver structured to be positioned adjacent at least one ear of a user of the apparatus at a time when the apparatus is worn on the user's head to acoustically output audio provided by at least one of the first and second audio devices.

6. The apparatus of claim 5, wherein the PTT switch is disposed on a casing of the headset in which the acoustic driver is disposed.

7. The apparatus of claim 5, further comprising a control box on which the PTT switch is disposed and coupled to a casing of the headset in which the acoustic driver is disposed by a cable.

8. The apparatus of claim 5, further comprising a control box on which the PTT switch is disposed and coupled to a casing of the headset in which the acoustic driver is disposed by a wireless connection.

9. An apparatus comprising:
   a first radio;
   a second radio; and
   a push-to-talk (PTT) switch having a center position, operable to a first non-center position from the center position to engage a PTT function of the first radio, operable to a second non-center position from the center position to engage a PTT function of the second radio, mechanically structured to prevent the PTT functions of both of the first and second radios from being simultaneously engaged, and in which a biasing force tends to bias the PTT switch towards the center position from the first and second non-center positions.

10. The apparatus of claim 9, wherein the PTT switch comprises a rocker switch having a first surface and a second surface, wherein the PTT switch is operable to the first non-center position by pressing on the first surface and is operable to the second non-center position by pressing on the second surface.

11. The apparatus of claim 9, wherein the PTT switch further comprises a spring providing at least a portion of the biasing force to tend to bias the PTT switch toward the center position from at least one of the first and second non-center positions.

12. The apparatus of claim 9, further comprising a communications microphone to detect speech to be conveyed to at a remotely located person through the PTT function of one of the first and second radios of which the PTT function is engaged through operation of the PTT switch.

13. The apparatus of claim 9, wherein the apparatus comprises a headset having at least one acoustic driver structured to be positioned adjacent at least one ear of a user of the apparatus at a time when the apparatus is worn on the user's head to acoustically output audio provided by at least one of the first and second radios.

14. The apparatus of claim 13, wherein the PTT switch is disposed on a casing of the headset in which the acoustic driver is disposed.

15. An apparatus comprising:
   a radio;
   an intercom system (ICS); and
   a push-to-talk (PTT) switch having a center position, operable to a first non-center position from the center position to engage a PTT function of the radio, operable to a second non-center position from the center position to engage a PTT function of the ICS, mechanically structured to prevent the PTT functions of both of the radio and the ICS from being simultaneously engaged, and in which a biasing force tends to bias the PTT switch towards the center position from the first and second non-center positions.

16. The apparatus of claim 15, wherein the PTT switch comprises a rocker switch having a first surface and a second surface, wherein the PTT switch is operable to the first non-center position by pressing on the first surface and is operable to the second non-center position by pressing on the second surface.

17. The apparatus of claim 15, wherein the PTT switch further comprises a spring providing at least a portion of the biasing force to tend to bias the PTT switch toward the center position from at least one of the first and second non-center positions.

18. The apparatus of claim 15, further comprising a communications microphone to detect speech to be conveyed to at a remotely located person through the PTT function of one of the radio and the ICS of which the PTT function is engaged through operation of the PTT switch.

19. The apparatus of claim 15, wherein the apparatus comprises a headset having at least one acoustic driver structured to be positioned adjacent at least one ear of a user of the apparatus at a time when the apparatus is worn on the user's head to acoustically output audio provided by at least one of the radio and the ICS.

20. The apparatus of claim 19, wherein the PTT switch is disposed on a casing of the headset in which the acoustic driver is disposed.

* * * * *